(12) United States Patent
Suh et al.

(10) Patent No.: US 9,549,134 B2
(45) Date of Patent: Jan. 17, 2017

(54) IMAGE CAPTURING AND DISPLAY APPARATUS AND METHOD

(75) Inventors: Sung Joo Suh, Seoul (KR); Chang Kyu Choi, Seongnam-si (KR); Kwon Ju Yi, Yongin-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 13/067,337

(22) Filed: May 25, 2011

(65) Prior Publication Data

US 2011/0304532 A1 Dec. 15, 2011

(30) Foreign Application Priority Data

May 27, 2010 (KR) .................. 10-2010-0049564

(51) Int. Cl.
*H04N 5/369* (2011.01)
*G09G 3/34* (2006.01)
*H04N 5/335* (2011.01)

(52) U.S. Cl.
CPC .......... *H04N 5/3696* (2013.01); *G09G 3/3406* (2013.01); *H04N 5/335* (2013.01)

(58) Field of Classification Search
CPC ..... H04N 5/3696; H04N 5/335; G09G 3/3406
See application file for complete search history.

(56) References Cited

U.S. PATENT DOCUMENTS

| | | | |
|---|---|---|---|
| 2006/0050409 A1* | 3/2006 | George et al. | 359/708 |
| 2006/0157640 A1 | 7/2006 | Perlman et al. | |
| 2007/0081200 A1* | 4/2007 | Zomet et al. | 358/484 |
| 2008/0106629 A1* | 5/2008 | Kurtz et al. | 348/333.01 |
| 2008/0309754 A1 | 12/2008 | Nayar | |
| 2009/0002341 A1 | 1/2009 | Saito et al. | |
| 2009/0160752 A1* | 6/2009 | Meynants | 345/100 |
| 2009/0207264 A1* | 8/2009 | Utsugi | 348/222.1 |
| 2010/0157030 A1* | 6/2010 | Nayar et al. | 348/54 |
| 2010/0289784 A1* | 11/2010 | Fujioka et al. | 345/207 |
| 2011/0019056 A1* | 1/2011 | Hirsch et al. | 348/333.01 |

FOREIGN PATENT DOCUMENTS

| | | |
|---|---|---|
| CN | 101126853 A | 2/2008 |
| CN | 101383132 A | 3/2009 |
| JP | 2008-511859 A | 4/2008 |
| JP | 2008-305154 A | 12/2008 |
| JP | 2009-086565 | 4/2009 |
| JP | 2009-135185 | 6/2009 |
| JP | 2009-146100 | 7/2009 |
| JP | 2010-509804 A | 3/2010 |

(Continued)

OTHER PUBLICATIONS

International Search Report issued on Jan. 12, 2012 for Corresponding Patent Application No. PCT/KR2011/003900.

(Continued)

*Primary Examiner* — David D Davis
(74) *Attorney, Agent, or Firm* — NSIP Law

(57) ABSTRACT

Provided is a display apparatus and method. The display apparatus may sense light reflected from an object and passed through a display panel, and may control a power of a backlight unit depending on whether the light has passed through the display panel.

49 Claims, 20 Drawing Sheets

(56) References Cited

FOREIGN PATENT DOCUMENTS

WO     WO 2009104667 A1 *   8/2009

OTHER PUBLICATIONS

Matthew Hirsch et al., "BiDi Screen: Depth and Lighting Aware Interaction and Dislay," in Proceedings of SIGGRAPH Asia Dec. 2009.
Matthew Hirsch et al., "BiDi Screen: Depth and Lighting Aware Interaction and Display; FAQ", SIGGRAPH Dec. 2009 (4pg).
Ramesh Neelamani, Hyeokho Choi, and Rechard Baraniuk, "ForWaRD: Fourier-Wavelet Regularized Deconvolution for Ill-Conditioned Systems," IEEE Transactions on Signal Processing, vol. 52, No. 2, Feb. 2004.
E. E. Fenimore, and T. M. Cannon, "Coded aperture imaging with uniformly redundant arrays," Applied Optics, vol. 17,pp. 337-347, 1978.
S. R. Gottesman, and E. E. Fenimore, "New family of binary arrays for coded aperture imaging,", vol. 28, pp. 4344-4352, 1989.
European Search Report issued on Oct. 22, 2015 in counterpart European Application No. 11167488.3 (11 pages, in English).
Japanese Office Action issue on Jun. 9, 2015 in counterpart Japanese Patent Application No. 2013-512547 (17 pages, with English translation).
Hirsch, Matthew, et al. "BiDi screen: a thin, depth-sensing LCD for 3D interaction using light fields." *ACM Transactions on Graphics* (*TOG*). vol. 28. No. 5. ACM, 2009. (10 page, in English)
Chinese Office Action issued on Dec. 12, 2014 in counterpart Chinese Patent Application No. 201180008918.5 (13 pages, with English translation).

* cited by examiner

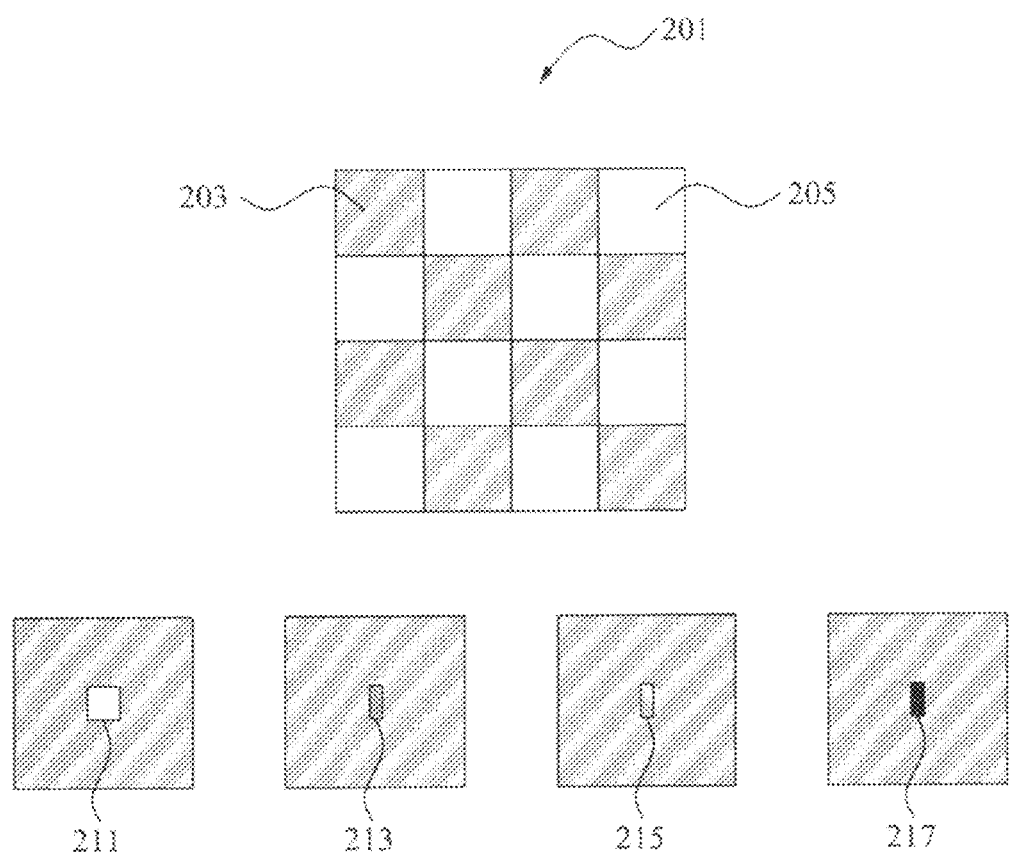

FIG. 3B

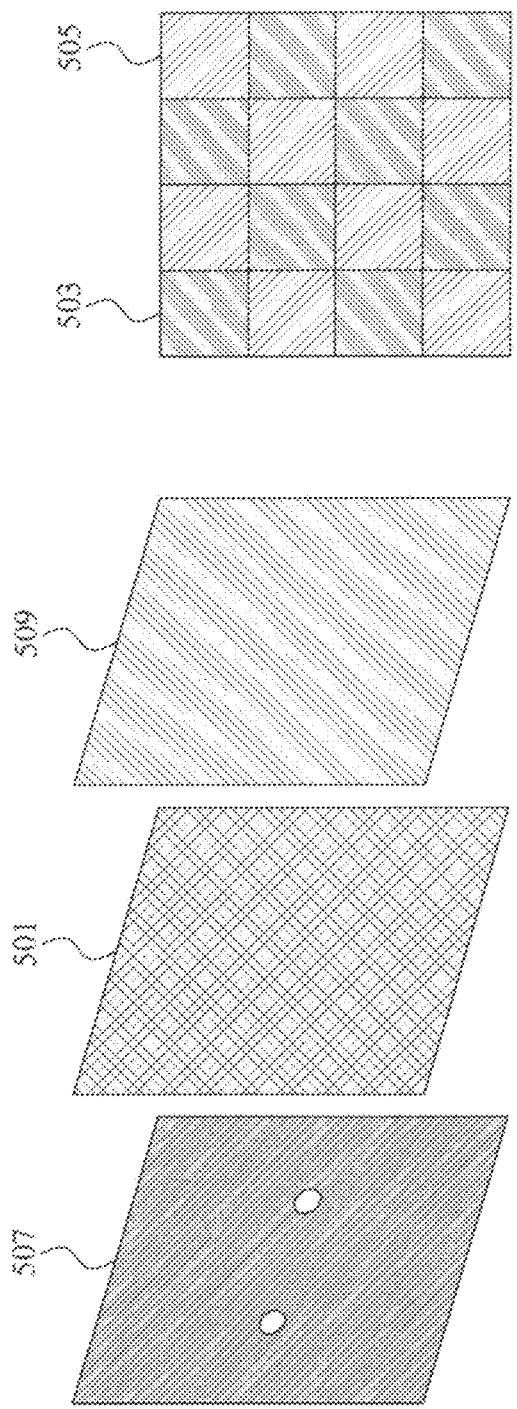

(i)　　　(ii)　　　(iii)

(i)          (ii)          (iii)

IMAGE CAPTURING AND DISPLAY APPARATUS AND METHOD

CROSS-REFERENCE TO RELATED APPLICATIONS

This application claims the priority benefit of Korean Patent Application No. 10-2010-0049564, filed on May 27, 2010, in the Korean Intellectual Property Office, the disclosure of which is incorporated herein by reference.

BACKGROUND

1. Field

One or more embodiments relate to a display apparatus and method, and more particularly to a display apparatus and method simultaneously sense incident light to generate an image and displaying an image.

2. Description of the Related Art

A display apparatus may include a display panel, a camera, and a backlight unit. The display apparatus may operate in a capturing mode for acquiring image data, or in a displaying mode for displaying the image data.

Two examples of such display apparatus have been discussed in an article by Hirsch et al., "A Thin, Depth-Sensing LCD for 3D Interaction using Light Fields," in Proceedings of SIGGRAPH ASIA December 2009, a similar display apparatus was set forth. In a first example, the display apparatus sequentially includes an angle limiter layer, a display panel/a coded mask layer, and a diffusing layer. The display panel is controlled to generate a coded mask effect of the coded mask layer, and a camera would be positioned behind the diffusing layer. The captured image data would thus be obtained from the surface of the diffusing layer. In this approach, it was necessary to position the camera a meter behind the diffusing layer to compensate for a lack of an angle-limiting film, which the authors of the article indicated was necessary, rather than suffering the downside affects of using an angle-limiting film in front of the display.

In an alternative approach, the display device sequentially includes the display panel, a mask, a single large-format sensor, and a backlight. The single large-format sensor detects light that is incident on the sensor after passing through the display panel. The authors indicated that it was necessary to have the single large-format sensor be made up of a plane of clear photo-detectors in a clear substrate or membrane, as it was necessary that the most light from the backlight be provided to the display panel. In these two approaches, the external camera and the single large-format sensor both resulted in a low resolution capturing capabilities, which was not as much of a concern to the authors because they were more focused on obtaining sufficient orthographic images for gesture detection, which they acknowledged did not require higher quality images.

The Hirsch et al. article additionally notes that the utilization of a dense camera array behind the display panel may not be practical and may be difficult to develop, as the approach would increase the engineering complexity compared to the use of the single large-frame sensor. As further noted by Hirsch et al., such a different sensor approach would introduce backlight non-uniformity issues due to sensor element blocking light generated by the backlight. Rather, the authors of Hirsch et al. pointed out the benefits of the transparent photodiode single large-format sensor, with a clear substrate or membrane, was specifically used so light from the backlight would not be blocked. The authors of Hirsch et al. have also noted that alternative technologies may not be available in the near future. The authors further note that their approach requires an extended image data capturing period when a modified uniformly redundant array (MURA) coding pattern is used, with the entire display panel being set to produce the MURA coding pattern for a few milliseconds, producing noticeable flickering. The extended period of time required for the MURA coding patter is required so the single large-frame sensor can uniformly capture image data that has been modulated by the tiled-MURA code.

Accordingly, a display apparatus including a camera or such a single large-frame sensor may have several limitations in acquiring an image, including not being able to accurately sense incident light while also operating the display panel to display images based on light radiating from the backlight.

SUMMARY

According to an aspect of one or more embodiments, there may be provided a display apparatus, including a sensor panel configured to sense a first incident light, incident to the sensor panel subsequent to passing through a display, and to at least partially block transmission of light through the sensor panel, and a controller to selectively control the display to be configured to pass the first incident light toward the sensor panel and to control the display to be configured to pass light out of the display to display an image, wherein the sensor panel includes plural distinct portions configured to each forward light from the sensor panel towards the display.

According to an aspect of one or more embodiments, there may be provided a display apparatus, including a display panel, a sensor panel including plural sensor units configured to sense incident light from the display panel and plural distinct portions configured to each forward light from the sensor panel towards the display panel, and a controller to selectively control opacities of pixels and/or sub-pixels of the display panel to produce patterns on the display panel for displaying an image on the display panel, in a second mode, and to form at least one pattern on the display panel controlled to be transparent and an area of the display panel surrounding the at least one pattern controlled to be opaque, to capture an image by the at least one sensor unit, in a first mode, wherein the plural distinct portions are respectively plural apertures or plural backlight units, with one or more of the plural apertures including a diffuser element, and with each of the plural backlight units respectively generating and directing light toward the display panel.

According to an aspect of one or more embodiments, there may be provided a display method, including selectively configuring a display to form a pattern with at least one transparent pixel or sub-pixel to pass a first incident light through the display and toward a sensor panel, behind the display, and to form an opaque area that at least surrounds the pattern, when a current mode is a first mode, and configuring the display to pass light from a backlight, behind the display, through the display, when the current mode is a second mode, sensing the first incident light, having passed through the display, upon incidence to the sensor panel that at least partially blocks transmission of light, in a first mode, and displaying an image on the display by passing light in a direction from the sensor layer through the display, and repeatedly controlling the current mode to only one of the first mode and the second mode, including at least a changing of the current mode plural times.

The method may include controlling, at a current time in the first mode, the display to have at least one pattern different than a pattern formed at a previous time when the current mode was the first mode, by changing at least one of a number of first pixels of the display that are selectively controlled to be opaque during the first mode, a number of second pixels of the display that are selectively controlled to be transparent during the first mode, positions of one or more pixels of the display that are controlled to be opaque during the first mode, and positions of one or more pixels of the display that are controlled to be transparent pixels during the first mode, than in the previous time.

The method may further include controlling, at a current time in the first mode, the display to have at least one pattern different than a pattern formed at a previous time when the current mode was the first mode, by changing at least one of a number of first sub-pixels of the display that are selectively controlled to be opaque during the first mode, a number of second sub-pixels of the display that are selectively controlled to be transparent during the first mode, positions of one or more sub-pixels of the display that are controlled to be opaque during the first mode, and positions of one or more sub-pixels of the display that are controlled to be transparent pixels during the first mode, than in the previous time.

The method may further include selectively controlling a combination of a capture rate, for capturing images from the sensor panel, and a display rate, for displaying plural images, to be greater than a maximum refresh rate of the display.

The method may still further include selectively controlling the display to only pass the first incident light toward the sensor panel in a first cycle, of plural fixed time length cycles, and controlling the display to only pass the light out of the display to display the image in a second cycle, of the plural fixed time length cycles, wherein the fixed time is a time it takes for the display to perform one refresh. The method may include selectively controlling opacities of pixels and/or sub-pixels of the display to produce patterns on the display for displaying the image on the display, in a second mode, and to form at least one pattern on the display controlled to be transparent and an area of the display surrounding the at least one pattern controlled to be opaque, to capture an image by at least one sensor unit of the sensor, in a first mode, wherein the display is controlled differently in the first mode and the second mode.

Additionally, the method may include determining a depth of an object represented in the first incident light based upon at least one detected size of a blur of the at least one pattern detected by the sensor panel, and the determining may further include determining plural depth measurements of the object represented in plural first incident lights each sensed by the sensor panel based respectively upon at least one detected size of a blur pattern for each sensed incident light, and generating 3D information of the object. Still further, the method may include monitoring a movement by the object over plural captured images and respectively generated plural 3D information and determining whether the monitored movement and generated plural 3D information indicates that a gesture, of plural defined gestures, is being made by the movement of the object, and controlling an operation of a device based on the determined gesture.

The method may include restoring the captured image by calculating a distance-based impulse response based on the determined depth, performing devolution of the captured image using the distance-based impulse response to compensate for refraction and/or geometric effects caused by the at least one pattern of the display, and encoding the restored captured image.

According to an aspect of one or more embodiments, there may be provided a display method, including selectively configuring a display to form a pattern with at least one transparent pixel or sub-pixel to pass a first incident light through the display and toward a sensor panel, behind the display, and to form an opaque area that at least surrounds the pattern, when a current mode is a first mode, and configuring the display to pass light from plural backlights of the sensor panel through the display, when the current mode is a second mode, sensing the first incident light, having passed through the display, upon incidence to the sensor panel that blocks transmission of light, in a first mode, and displaying an image on the display by passing respectively generated light from each backlight from the sensor layer through the display, and repeatedly controlling the current mode to be one of the first mode and the second mode, including at least a changing of the current mode plural times.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects and advantages will become apparent and more readily appreciated from the following description of embodiments, taken in conjunction with the accompanying drawings of which:

FIGS. 2A-2B, 3A-3B, 4A-4B, and 5A-5B illustrate one or more sensor panels, such as the sensor panel 107 of FIG. 1A, included in a display apparatus, according to one or more embodiments;

DETAILED DESCRIPTION

Figure 1A:
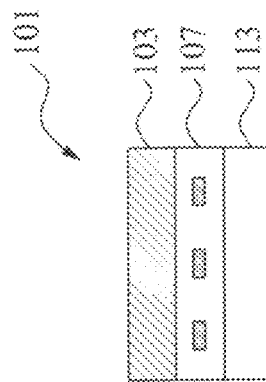
FIGS. 1A and 1B illustrate a display apparatus and method, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1A:
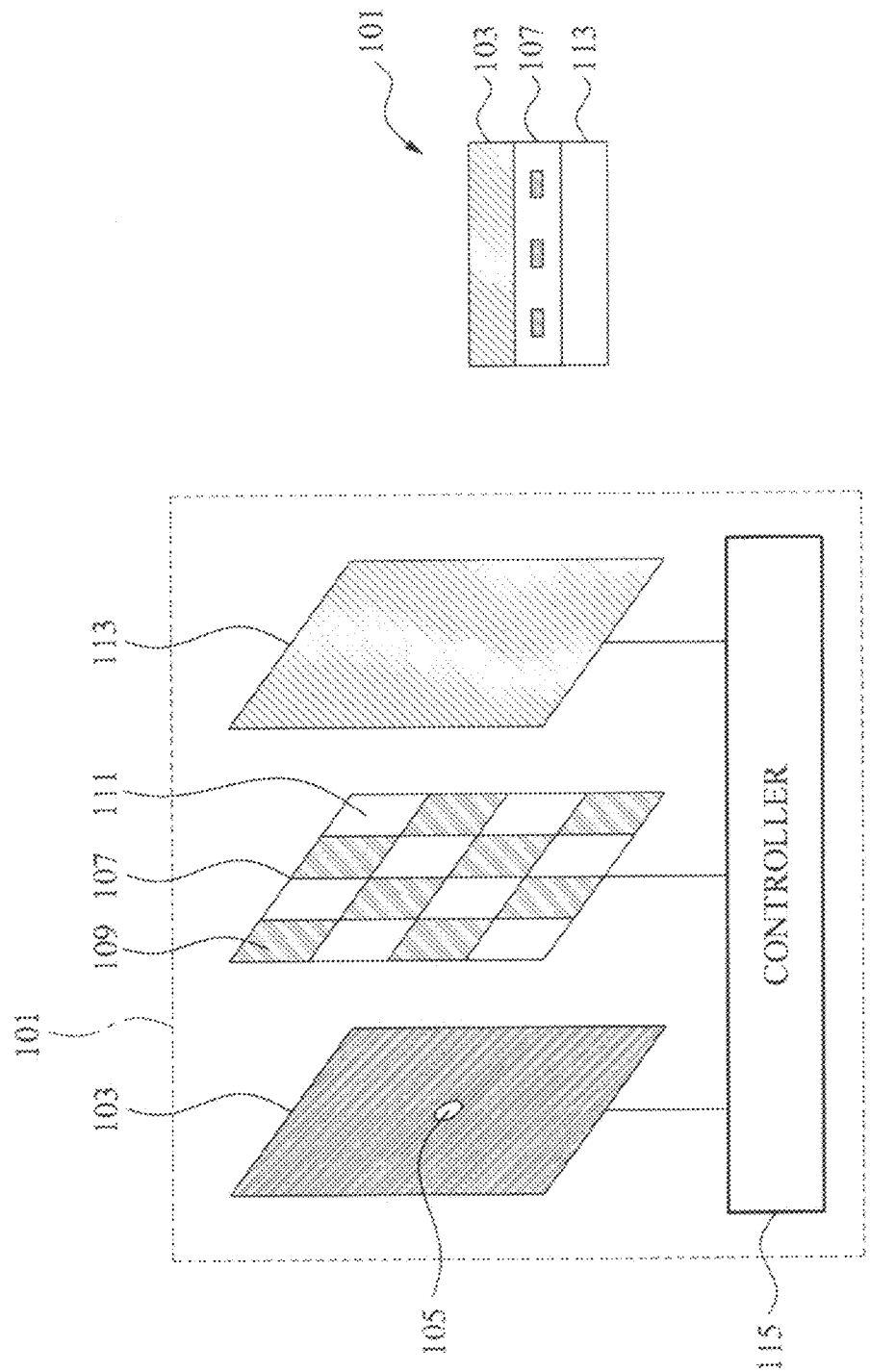
Figure 1B:
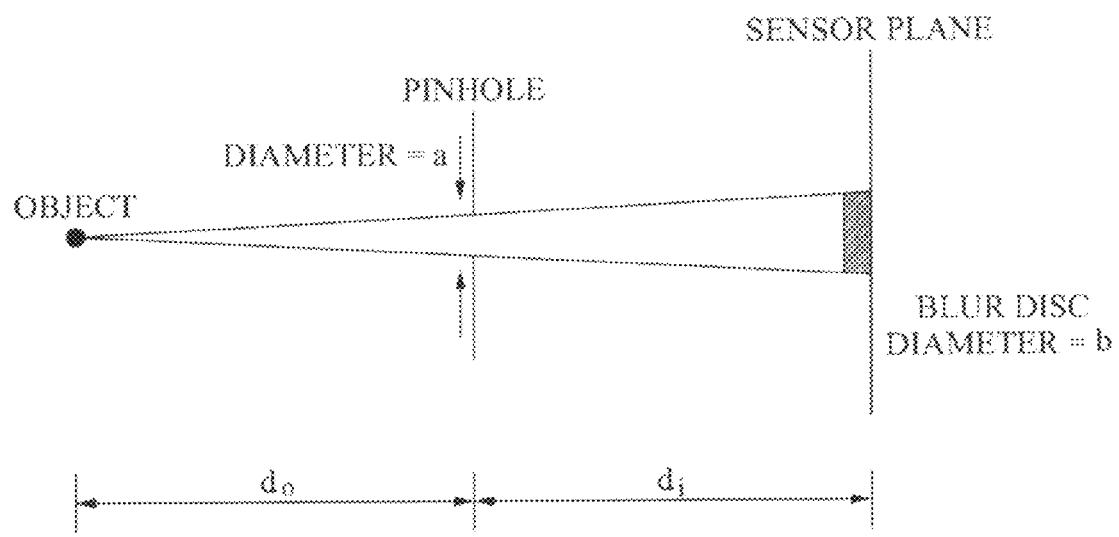

FIGS. 1A and 1B illustrate a display apparatus and one or more corresponding image capturing and/or displaying methods, according to one or more embodiments.

Referring to FIG. 1A, the display apparatus 101 may include a display panel 103, a sensor panel 107, a backlight unit 113, and a controller 115, for example. In an embodiment, the sensor panel may include one or more sensor units 109 and one or more apertures 111. The left illustration of FIG. 1A shows a more expanded representation of the display apparatus 101, while the right illustration shows how layers of the display apparatus can be manufactured. In an embodiment, the manufacturing of the right illustration of FIG. 1A, of the display panel 103, sensor panel 107, and backlight unit 113, may be performed by any conventional semiconductor or optical/display fabrication methodology. According to one or more embodiments, the below differing arrangements of the display panel 103, sensor panel 107, sensor units 109, apertures 111, backlight units 113, and any potential diffusing layers therein, may equally be manufactured in the inventive arrangements by such semiconductor or optical/display panel fabrication methodologies. As shown in the right illustration of FIG. 1A, in an embodiment, the sensor panel may be constructed of a substrate that can be etched or photo-resist washed to form the apertures 111, so there may be fixed areas where light may be transmitted through, e.g., from the lower backlight unit 113 toward to display panel 103, and fixed areas where light would be blocked. Additional, as only an example, if a diffuser were incorporated into one or more apertures, this incorporation could also be performed at the time the sensor panel 107 is manufactured, such that when light passed through the one or more apertures the light would be diffused by the diffuser.

In one or more embodiments, the display panel 103 may be a liquid crystal display (LCD) panel, though embodiments are not limited to the same. In an embodiment, the display panel 103 may be any panel that may selectively provide one or more pinholes and/or masks enabling the passing of incident light. Here, the display panel 103 may operate in a capturing mode or in a displaying mode based on a predetermined criterion of the controller 115. For example, when the display panel 103 refreshes at a frequency of 120 Hz, the display panel 103 may switch between the capturing mode and the displaying mode every refresh over the total 120 Hz, e.g., totaling 60 Hz in the capturing mode and 60 Hz in the displaying mode. In an embodiment, the refresh rate of the display panel 103 is the number of times per second in which the display panel 103 can display the data it is given. When the display panel 103 is an LCD panel, for example, the refresh rate may be the number of times the LCD panel can change states per second, e.g., changing a pixel or sub-pixel from an opaque state to a transparent state, or any available gradation there between, which may be representative of combined times it takes all underlying control operations to be performed.

Accordingly, the pinholes and/or masks may be selectively provided by the display panel 103 without all or some of the pinholes or masks in one cycle, e.g., while radiating light out of the display 103, and the pinholes and/or masks may be selectively provided by the display panel with all or some of the pinholes or masks in another cycle, e.g., selectively passing light through the display panel 103 toward the sensor panel 107. It may not be required that the pinholes or masks are completely removed during the radiating cycle, and it is not necessary that all available, or the same, pinholes or masks be maintained in every capturing cycle. Alternatively, in an embodiment, all pinholes or masks are removed in the displaying mode.

In the capturing mode, the display panel 103 may pass an incident first light, e.g., as reflected from an object, to the sensor panel 107. Specifically, the display panel 103 may be controlled to form one or more patterns for passing the incident first light by controlling a first pixel or a first sub-pixel, for example, to be opaque and by controlling a second pixel or a second sub-pixel, also as an example, different from the first pixel, to be transparent. For example, the display panel 103 may be controlled to form a pattern 105, including a circular hole pattern, and may pass the incident first light through the pattern 105. Here, the pattern 105 may be formed by the second pixel, and though the second pixel has been described as being only a single pixel or sub-pixel, one or more embodiments include plural neighboring second pixels, e.g., which could be used to control the aperture diameter of the pinhole represented by the pattern 105. Likewise, depending on embodiment and differing uses of the ultimately sensed light, the pattern 105 would not be limited to having only a circular form, and may be non-circular. In an embodiment, the size of the pattern 105 may be controlled to have a same size or number of pixels/sub-pixels for different sized display panels and may be selectively modified based on differing resolutions of each display to maintain the same pattern size.

Accordingly, in one or more embodiments, the display panel 103 may be controlled to form various types of patterns. As only examples, the display panel 103 may be controlled to form the pattern including at least one of a circular hole, a polygonal hole, and a modified uniformly redundant array (MURA) by combining the first pixel and the second pixel. Here, the pattern 105 indicates an optical meaning of a pattern that may pass light instead of blocking light.

The display panel 103 may be controlled to repeatedly configure the formed pattern based on a number of incident first lights to be passed. For example, when two incident first lights are desired to be passed, the display panel 103 may be controlled to provide two patterns. When four incident first lights are desired to be passed, the display panel 103 may be controlled to provide four patterns.

The display panel 103 may be controlled to form various types of patterns by changing at least one of a number of opaque first pixels, a number of transparent second pixels, a position of each opaque first pixel, and a position of each transparent second pixel.

The display panel 103 may be controlled to form a plurality of patterns, and may also change a number of patterns or a position of each pattern at predetermined intervals. For example, the display panel 103 may be controlled to form the plurality of patterns horizontally or vertically, or in any other organized arrangement. In one or more embodiments, some or all of the patterns or corresponding positions may be randomly chose by the controller 115, and/or some of the patterns or corresponding positions may vary between capturing cycles.

In the displaying mode, the display panel 103 may be controlled to clearly outwardly display image data using a second light emitted from the backlight unit 113, radiating light outward toward the display panel 103.

The sensor panel 107 may be disposed after or below the display panel 103 to acquire image data by sensing the incident first light, e.g., reflected from the object, and passed through the display panel 103 toward the sensor panel 107.

The sensor panel 107 may include one or more sensor units 109 to sense incident light and apertures 111 to pass light radiating from the backlight, for example, radiating toward the display panel 103. In one or more embodiments, the sensor panel 107 may be configured such that the sensor units 109 and the apertures 111 form a grid pattern, or may be configured so the sensor units 109 and the apertures 111 form a repeating pattern, noting that alternative patterns are also available. In one or more embodiments, the placement of the sensor units 109 may not be evenly distributed over the entire sensor panel 107, and may be of increased density in one or more areas compared to the density of the apertures 111 in the one or more areas. Further, in an embodiment, portions of the sensor panel 107 may be made up of all or primarily apertures 111 or sensor units 109. For example, in an area that may correspond to the level of a user's eyes, there may be an increased density of the sensor units 109, so a remote recipient would have the feeling that the user is looking directly at the camera, and directly at the recipient. Alternative reasons for changing the densities are equally available.

The sensor units 109 may be represented by at least one sensor, which may sense the incident first light, e.g., reflected from an object, as passed through the display panel 103. As described above, one or more sensor units 109 may be arranged to sense the respective incident first light passed through the pattern 105 formed in the display panel 103. Here, when there exists a plurality of patterns 105, such as plural holes, one or more sensor units 109 may sense the respective incident first lights passed through the plurality of patterns. The number of sensor units 109 that may be needed to sense the incident light from one such pattern may be calculated, or estimated, and the sensor panel 107 configured accordingly. In one or more embodiments, the sensor layer 105 may be reconfigurable and not fixed as more or less sensor units 109 and more or less apertures 111 may be selectively used or available.

When the pattern 105 of the pattern is formed based on a pixel unit including red (R), green (G), and blue (B), the sensor unit 109 may acquire image data corresponding to R, G, and B by sensing the incident light that has passed through the pattern 105. When the pattern 105 is formed based on a sub-pixel unit, a pattern formed as an R sub-pixel, a pattern formed as a G sub-pixel, and a pattern formed as a B sub-pixel may be sequentially formed in different cycles, for example, or through neighboring sub-pixels of different colors. Here, to increase luminance of the captured image, the number of times incident light from the G sub-pixel is captured may be greater than the respective number of times incident light from the R or B sub-pixels, within the example 120 available cycles. Accordingly, the sensor unit(s) 109 may acquire image data corresponding to R, G, and B by sensing the incident light that has passed through the patterns of the display panel 103.

In an embodiment, such as when the display panel 103 does not include or is controlled to not apply respective color filters to the different pixels or sub-pixels, each sensor unit 109 may be configured to include a particular color filter to acquire image data corresponding to a corresponding color of the color filter. For example, one sensor unit 109 may include a first sensor unit and a second sensor unit. Each of the first sensor unit and the second sensor unit may include a differently colored unit color filter. Here, there may further be a third sensor unit with still another differently colored unit color filter. Also, each of the first sensor unit and the second sensor unit may include a plurality of color filters having different colors. Additionally, as noted above, the densities and arrangements of the differently colored filters and corresponding sensor units 109 is not required to be equal or even, and their densities and arrangements may vary based upon embodiment.

When the sensor unit 109 is configured to have an R color filter, the sensor unit 109 may acquire image data corresponding to the color red by sensing the incident light that has passed through the pattern 105. When the sensor unit 109 is configured to have a B color filter, the sensor unit 109 may acquire image data corresponding to the color green by sensing the incident light that has passed through the pattern 105. When the sensor unit 109 is configured to have a B color filter, the sensor unit 109 may acquire image data corresponding to the color blue by sensing the incident light that has passed through the pattern 105. In one or more embodiments, the arrangement of different filtering sensor units 109 on the sensor panel 107 may be according to different Bayer patterns, for example.

When the backlight unit 113 is disposed behind or below the sensor panel 107, the aperture 111 of the sensor panel 107 may pass the radiating second light emitted from the backlight unit 113 towards the display panel 103. Here, the aperture 111 may be represented by an optical member that may selectively pass light, always pass light, or merely represented by an emptiness in the sensor panel 107, instead of blocking the light. The optical member may have one or more lens features for directing light from the backlight unit 113. The aperture 111 may be similar to the pattern 105 of the display panel 103, and in one or more embodiments may be controllable to be transparent for the displaying mode and blocking of light in the capturing mode. In an alternate embodiment, the aperture is a fixed optical member that always permits light to be passed.

Accordingly, when the backlight unit 113 is disposed behind or below the sensor panel 107, the aperture 111 enables the second light emitted from the backlight unit 113 and radiating towards the display panel 103 to be transferred to the display panel 103 without being blocked by the sensor panel 107. Accordingly, the display panel 103 may clearly display the image data through the apertures 111 even when the sensor units 109 block transmission of one or both of the first incident light and the second light. Similar to above, the densities of sensing units 109 compared to the densities of the apertures 111 may be different, and their arrangements are not required to be fixed, equal, or even. In an embodiment, as only an example, the sensor panel is configured to include or use a greater number of apertures 111 than the number of sensor units 109 so as to increase display resolution, or configured to include or use a greater number of sensor units 109 than apertures 111, so as to increase captured image resolution.

According to another embodiment, the sensor panel 107 may further include, in the aperture 111, a diffuser to prevent the radiating light from the backlight unit 113 from being partially concentrated, or the sensor panel 107 may be configured to include the backlight unit 113, e.g., in the position of the aperture 111, instead of using the aperture 111.

The display apparatus 101 may further selectively include a diffuser between the display panel 103 and the sensor panel 107. Also, the display apparatus 101 may prevent the incident first light, to be sensed by the sensor unit 109 of the sensor panel 107, from being blocked by such a diffuser posited before or above the sensor panel 107 by arranging the sensor panel 107 to incorporate the diffuser with the aperture 111 of the sensor panel 107, or when one or more of the backlight units 113 are arranged on the sensor panel 107 instead of the aperture 111, the sensor panel 107 may also include a diffusing layer atop or before each backlight unit 113 to diffuse the light radiated by each backlight unit 113.

Additionally, though the refresh rate of the display panel may be fixed and frame rates for displayed images would decrease proportionally to the capture rate, in an embodiment, when the pattern 105 is intentionally not changed upon entering the displaying mode, e.g., even if there may be available image data for display in the same area as the pattern 105 of the display panel 103, if select apertures 111 neighboring a sensor unit(s) 109 corresponding to the pattern 105 are controllable to be opaque, or neighboring backlighting units 113 incorporated into the sensor panel 107 are controlled to not emit their respective second lights, during the displaying mode, an image may be captured from the specific sensor unit(s) 109 at the exact time an image is being displayed through all other portions of the display panel 103 depending on the ambient light effect of neighboring second lights that are radiating through other apertures 111 or emitted by other neighboring backlighting units 113. In such an embodiment, the display may operate at its full refresh rate and images may be captured at their full capture rate.

Figure 11A:
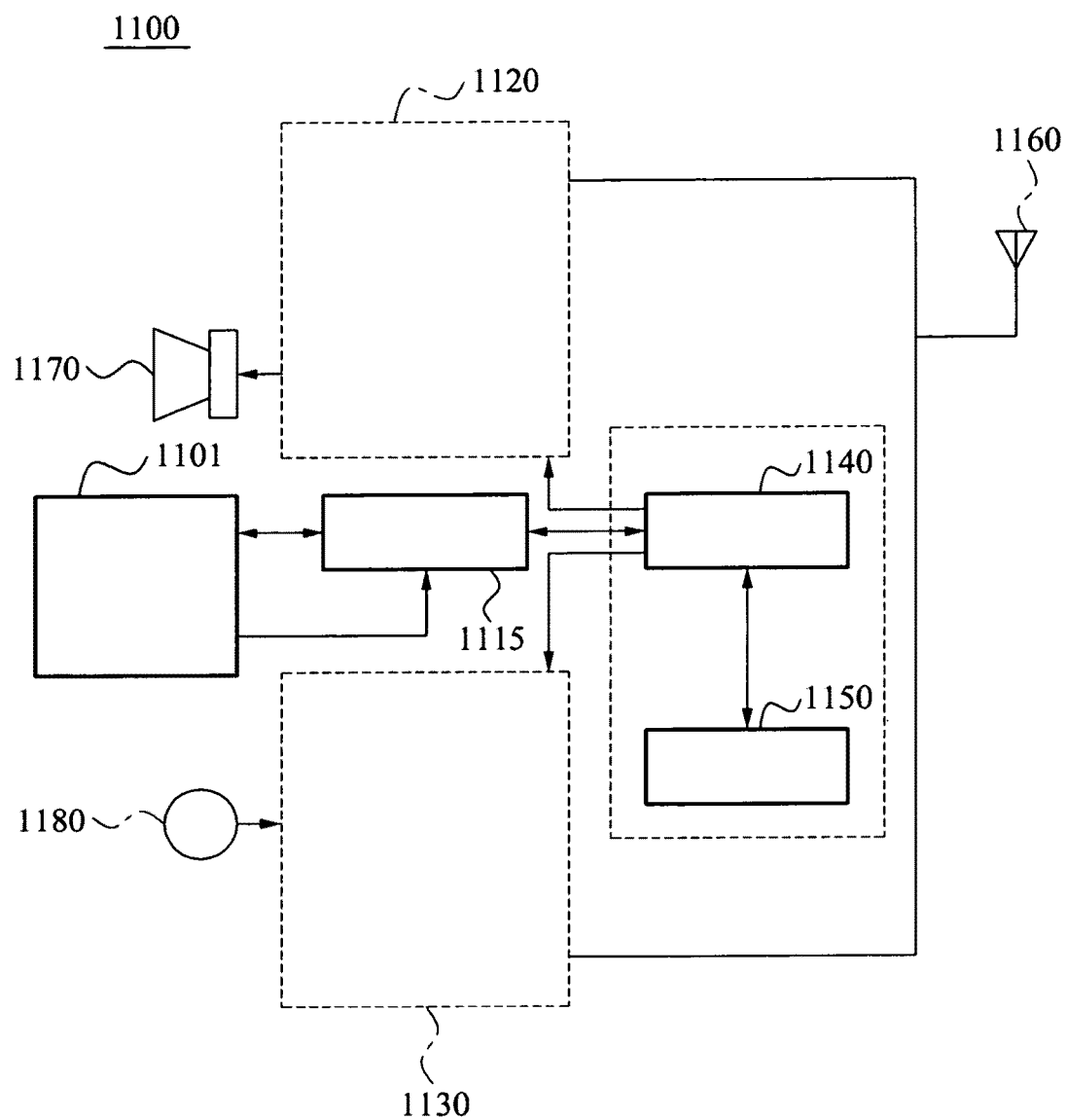
FIGS. 11A through 11C illustrate a display device, system, and method, according to one or more embodiments.

However, as the ambient effects may make such same-time capturing impracticable, alternative embodiments may include the display apparatus 101, or the display device 1100 of FIG. 11A, having the respective display panels 103 specifically engineered to reduce the ambient light effect, e.g., for particular areas of the display. As an alternative, the display apparatus 101 or display device 1100 of FIG. 11A may have a functional mode, for example, that would permit additional neighboring apertures to be made opaque or additional backlighting units 113 to be controlled to not emit their respective second lights to reduce the ambient light effect, in which case the controller could also change a vertical or horizontal scanning ratio or aspect ratio of the displayed images to compensate for the loss in viewable space of the display panel 103. Herein, the term 'simultaneous' with regards to displaying an image and capturing an image means that image capturing can be performed nearly at the same time as image displaying, potentially with either mode following the other in a directly subsequent cycle. Herein, regarding a capturing of an image and displaying of an image, the term 'same time' means that the displaying and displaying occur within the same cycle. When capturing and displaying of respective images occur in at the same the sampling rate and display rate, e.g., frames per second, may sum up to be greater than the actual refresh rate of the display panel 103. Accordingly, in an embodiment, the controller 115 may control a capture rate for capturing images using the sensor layer 107 and a display rate for displaying images using the display panel 103, at the same time to be in total greater than the maximum refresh rate of the display panel 103. Further, the controller 115 may selectively perform the capturing mode and displaying mode simultaneously or at the same time.

The controller 115 may control the display panel 103 to enable the acquiring or capturing of an object image in the capturing mode and the displaying of image data in the displaying mode by switching the mode of the display panel 103 to/from the capturing mode or the displaying mode based on a predetermined criterion. As noted above, in an embodiment the predetermined criterion may merely be whether the previous operation mode was the capturing mode or the displaying mode, and to currently operate in a different mode, e.g., in an alternating manner. However, in one or more embodiments, the percentage of the cycles, such as the percentage of cycles in the 120 available cycles (120 Hz refresh rate) of an example LCD panel, for each of the capturing mode and the displaying mode may not be uniform.

In an embodiment, more cycles may be designated for the capturing mode, or more cycles may be designated for the displaying mode. In an embodiment, the number of cycles a same mode operation is maintained may also change during the total 120 available cycles, as the number of cycles may vary between such same mode operations that the other mode operates. These variances between operation modes may be controlled by the controller 115, for example, and may be based on different factors, such as the desired image capturing resolution, the desired image capturing frame-rate, the desired image displaying resolution, or the desired image displaying resolution. These desires may be user controlled and stored in a memory of the display device, and/or may be based on external factors, such at the amount of available light for capturing image, the viewing environment where displayed image is being viewed, the data transportation capabilities or settings between the display device and another display device, such as in teleconferencing, where the captured image data would be encoded and transmitted, either wired or wirelessly, to the other display device.

Here, in an embodiment, when the other display device, as an example remote display device, is also a display apparatus 101, the remote display device may also be respectively performing capturing mode and displaying mode operations and respectively equally controlling any of the above controls on image capturing and/or displaying. In an embodiment, the capturing mode and displaying mode configurations and operations of an example local display device may control the local capturing mode and displaying mode configurations and operations based on the capturing mode and displaying mode configuration and operation settings of the remote display device. Accordingly, in one or more embodiments, encoded image data may be coupled with information identifying the settings of the local display device. Here, the remote or local display devices may also decode this information identifying the settings of the respective local or remote device. The information may further include indications of why the settings were instituted, such as due limitations in processing or display/capturing capability of either device, or transmission channel limitations.

When the display panel 103 is controlled to be in the capturing mode, the controller 115 may adjust a size of one or more of the patterns formed on the display panel 103 based on a distance between the display panel 103 and the sensor panel 107, or a size of the sensor panel 107. For example, the controller 115 may be capable of being used in differently sized display devices, with different resolutions, and/or with different distances between the respective display panel 103 and sensor panel 107, e.g., in an embodiment of the display apparatus 101 where the distance can be modified or when the controller is first determining the appropriate size or location for the pattern 105 and determines the internal dimensions of the display apparatus 101. One or more embodiments include a system having plural display devices with respective capturing mode capabilities through respective sensor panels 107 and controllers 115, with each of the configurations of the display devices not being required to have the same configuration, such as the available different arrangements of the pattern 105, sensor units 109, aperture 111, backlight 113, and diffusing elements. Still further, in an embodiment when there are more than two such display devices and more than two remotely generated images are displayed on the local display panel 103, densities of the sensor units 109 in the local sensor panel 107 may be greater in the areas corresponding to the displayed images, compared to densities of the sensor units 109 in other portions of the sensor panel 107. With such an arrangement, both remote viewers may be provided with the feeling that the local viewer is looking directly at each of them.

The controller 115 may control a power of the backlight unit 113 associated with a light emission towards the display panel 103 based on the mode of the display panel 103 and thereby control the light emitted from the backlight unit 113.

For example, when the display panel 103 is in the capturing mode, the controller 115 may power off the backlight unit 113 so that the second light may not be emitted from the backlight unit 113 towards the display unit 103, so the second light does not interfere with the sensing of the incident first light. When the display panel 103 is controlled to be in the displaying mode, the controller 115 may power on the backlight unit 113 so that the second light may be emitted from the backlight unit 113 towards the display unit 103. Alternatively, in an arrangement where the backlight unit 113 is below the sensor panel 107, the aperture 111 may be configured to be controllable to change opacity from opaque to transparent to selectively block the second light, so the back light would not have to cycle on and off.

The controller 115 may control a sensor image restoring unit, included in the controller 115, as only an example, to interpolate image data acquired by sensing the incident first light using one or more sensor units 109 of the display panel 103, and to restore image data lost due to the inclusion of the aperture 111 in the sensor panel 107, compared to a configuration where the aperture 111 was replaced by another sensor unit 109 that would have sensed the incident first light incident on the same position of the sensor panel 107. Accordingly, the controller 115 may acquire the image data that may more clearly express the corresponding object. In an embodiment, different sensor units 109 or groups of sensor units 109 may be capturing image information for different purposes. For example, a sensor unit 109 or a group of sensor units 109 may be capturing image data for transmission to a remote viewing device, while alternate sensor units 109 or groups of sensor units 109 may be capturing image data for motion detection or depth detection. The depth detection may be used for encoding the captured image data in a 3D graphics data format, for example, of used for controlling a focus or image compensation based on depth. The motion detection may be used with both on-surface (touching the surface of the display device) motion detection and/or off-surface (not touching the surface of the display device) motion detection, for detecting gestures of the user, for example, which may be used to control operations of the display device. In one or more embodiments, the controller 115 controls the separate detections, the on/off surface motion detection, and the depth detection. Depending on computational complexity, some detection processes may be delegated to alternate processing elements of the display apparatus 101 or display device 1100, as shown in FIG. 11A.

Accordingly, one or more embodiments above enable a user to manipulate operations of the display apparatus 101 through a multi-touch interface based at least on the captured image data by the sensor panel 107, either by directly touching the display or through off-surface gestures or other detectable imaging features that can be inferred or set as a control of the display apparatus 101. Control of the display apparatus is available by more then the image detected gestures, such as based on detected environments surrounding the display apparatus 101 or features detected in the facial image of the viewer, including for facial recognition for secure use of the display apparatus 101 or secure access of remote information. The mood of the viewer may also be detected. One or more embodiments include an interface technology that enables a natural interaction even though the user is at a distance from a screen, such as proximate sensing and touching, gesture recognition and long-distance gesture input, e.g., beyond multiple touches available through on-surface input methods, and detection of a camera level. Such multi-touch interface detection, off-surface gesture detection, off-surface image feature detection, facial recognition, emotion detection, and proximate and long-distance gesture detection and input interface are implemented in one or more embodiments based on conventional known techniques, though the capturing of the necessary image and depth information, and transmission and reception of any available remote image data and capture configurations, for example, can only be achieved through the arrangements set forth herein.

In previous approaches, it was not possible to have eye contact when operating a display device in a video call mode, so with the previous approaches users would not take advantage of such video call modes since the user's would not feel that they were viewing each other's face due to the non-matching between the screen position and camera position. Similarly, due to the drawbacks of the previous approaches, users of such devices would not feel as if the user was physically with a counter party at a very remote location using a large screen such as Immersive Wall and Smart Window, as when the users moved closer to the screen, the front image of the user would be lost because of the necessary distant location of the camera and the moving user. As another example, previous approaches were unable to simultaneously perform capturing of the image of the user while permitting the user to also control the display device through a gesture interface, as the camera for the capturing of the image of the user are typically positioned at an upper end of the display, which makes gesture detection difficult. Similarly, when camera placement was more appropriate for gesture detection, the placement of the camera would not be appropriate for image capturing of the user. Even with the Hirsch et al. system described above, when a camera was positioned behind the display panel, the image resolution was inadequate for image capturing and the frame rate would not be satisfactory for accurate gesture detection.

However, these drawbacks are all overcome by one or more of the above described embodiments.

An operation of the display apparatus may be more fully understood by reference to FIG. 1B, which illustrates the operation of the display panel 103 and sensor panel 107 in acquiring image data with respect to an object with a pinhole camera, according to one or more embodiments. Here, the pinhole camera represents at least the pattern 105 of FIG. 1A, for example. Discussions below regarding operations of the pinhole camera, such as calculations being performed, may be performed by the controller 115 of FIG. 1A, or alternative processing devices, such as in the display device 1100 of FIG. 11A.

Referring to FIG. 1B, the pinhole camera corresponds to a camera forming an image on a sensor pane by employing a pinhole instead of using lenses to focus the incident light. Accordingly, the pinhole camera may use, as the pinhole, pattern 105 in the display panel 103, and may use the sensor panel 107 as the sensor plane. When a plurality of patterns are formed on the display panel 103, an effect of a plurality of cameras may be provided.

Two types of blurs may occur based on the size of the pinhole, e.g., pattern 105 of the display panel 103. For example, when an aperture diameter of the pinhole is relatively large, a blur by a geometric effect may occur. When the aperture diameter of the pinhole is relatively small, a blur by a diffraction effect may occur.

The blur $b_G$ by the geometric effect may be expressed by the below Equation 1, for example.

$$b_G = \frac{a(d_o + d_i)}{d_o} \quad \text{Equation 1}$$

In Equation 1, $d_o$ denotes a distance between an object and the pinhole, a denotes the aperture diameter, and $d_i$ denotes a distance between the pinhole and the sensor plane.

With respect to a wavelength λ of light, the blur $b_D$ caused by the effect of optical diffraction may be expressed by the below Equation 2, for example $$b_D = \frac{2.44\lambda d_i}{a} \quad \text{Equation 2}$$

In Equation 2, $d_i$ denotes the distance between the pinhole and the sensor plane.

A size b of a final blur corresponds to a sum of the two effects and thus, may be expressed by the below Equation 3, for example.

$$b = b_G + b_D = \frac{a(d_o + d_i)}{d_o} + \frac{2.44\lambda d_i}{a} \quad \text{Equation 3}$$

When the aperture diameter and the distance between the pinhole and the sensor plane are known, the pinhole camera may calculate the size b of the blur and calculate the depth of the object, or distance between the object and the pinhole, according to the below Equation 4, for example $$d_o = \frac{a^2 d_i}{ab - 2.44\lambda d_i - a^2} \quad \text{Equation 4}$$

Here, using Equation 4, the distance between the object and a display panel, or the depth of the object, may be calculated based upon the two blurs. Briefly, it is noted that this is different than previous approaches, such as in the above referenced Hirsch et al. article, where the authors use Equation 3 (as Equation (1) in Hirsch et al.) for a different purpose to achieve a different answer; the authors used information from the two blurs to determine the angular resolution of their system to control the number of orthographic views, rather than for obtaining depth information.

The pinhole camera may calculate an inverse impulse response based on the distance $d_o$ between the object and the pinhole. The pinhole camera may further restore distance-based image data by performing de-convolution using the inverse impulse response with respect to the blurred image data acquired by the sensor plane, as shown in the below Equation 5, for example.

$$I(x,y) = I'(x,y) * H^{-1}(x,y) \quad \text{Equation 5:}$$

In Equation 5, I(x, y) denotes the restored image data, I'(x, y) denotes the blurred image data, and $H^{-1}$ (x, y) denotes the inverse pulse response.

Accordingly, the pinhole camera may acquire more accurate image data based on determined distance between the object to the pinhole. Using the display apparatus 101 of FIG. 1A as an example, the controller 115 may accordingly determine the distance between the object and the pattern 105 and then restore the image captured by corresponding one or more sensor units 109 based on that determined distance.

Figure 2B:
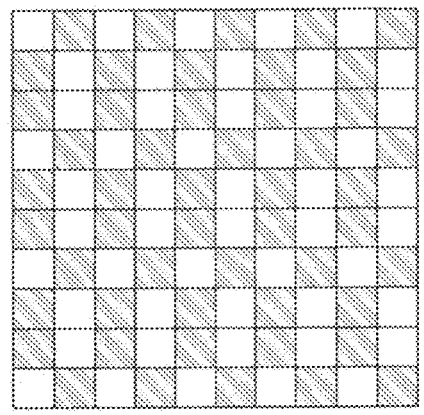
Figure 2B:
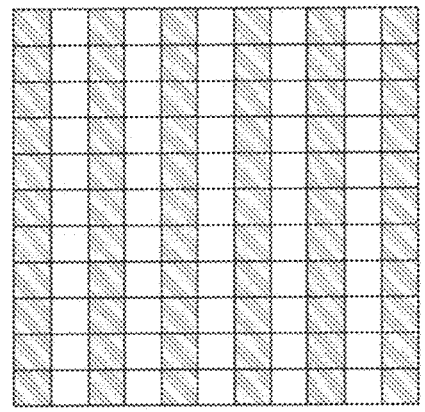
Figure 2B:
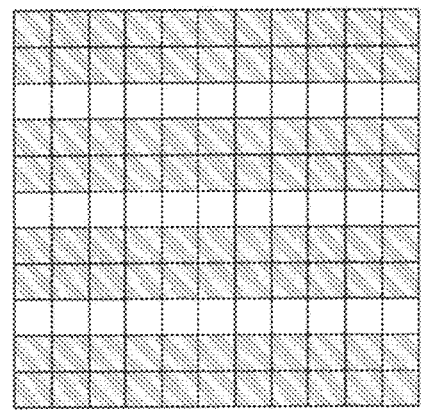

FIGS. 2A and 2B illustrate a sensor panel 201, such as the sensor panel 107 of FIG. 1A, of a display apparatus, according to one or more embodiments.

Referring to FIG. 2A, the sensor panel 201 may include a sensor unit 203 to sense incident light and an aperture 205 to pass light radiating from below the sensor panel 201. The sensor panel 201 may be configured such that the sensor unit 203 and the aperture 205 are arranged in a grid pattern, or may be configured such that the sensor unit 203 and the aperture 205 are arranged in a repeating pattern. Through this, in an embodiment, the sensor units 203 and the apertures 205 may be uniformly distributed.

Accordingly, in this embodiment, the sensor panel 201 may uniformly acquire an incident first light, e.g., reflected from an object, by having the sensor units 203 and the apertures 205 configured to be distributed, and may uniformly transfer, to an upper display panel, a second light radiating from a backlight unit below the sensor panel 201.

When a pattern included in a pattern of the display panel in the capturing mode is formed based on a pixel unit of the display panel, including R, G, and B pixel units, the sensor panel 201 may acquire image data corresponding to R, G, and B by sensing the light passed through a pattern 211. Also, when the pattern included in the pattern of the display panel is formed based on a sub-pixel unit, a pattern 213 formed as an R sub-pixel, a pattern 215 formed as a G sub-pixel, and a pattern 217 formed as a B sub-pixel may be sequentially formed. Accordingly, the sensor panel 201 may acquire image data corresponding to R, G, and B by respectively sensing the light passing through the patterns 213, 215, and 217.

Configurations of the sensor pattern 201 are not limited to those shown in FIG. 2A, and thus, configurations of the sensing units to sense the incident light and apertures to pass the radiating light may vary as shown in the different configurations shown in the left, center, and right sensor panel illustrations of FIG. 2B.

Figure 3A:
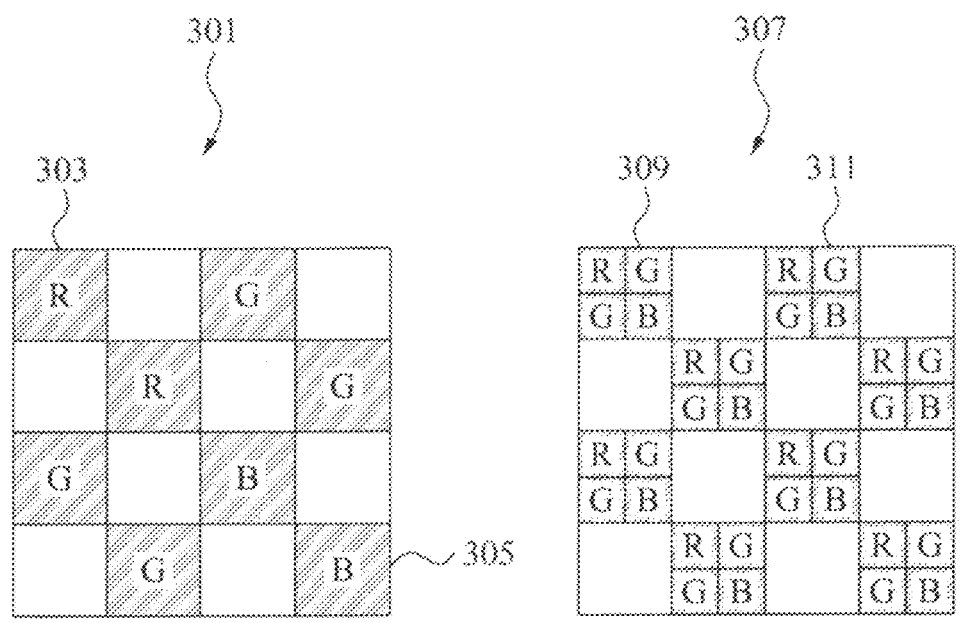
Figure 3B:
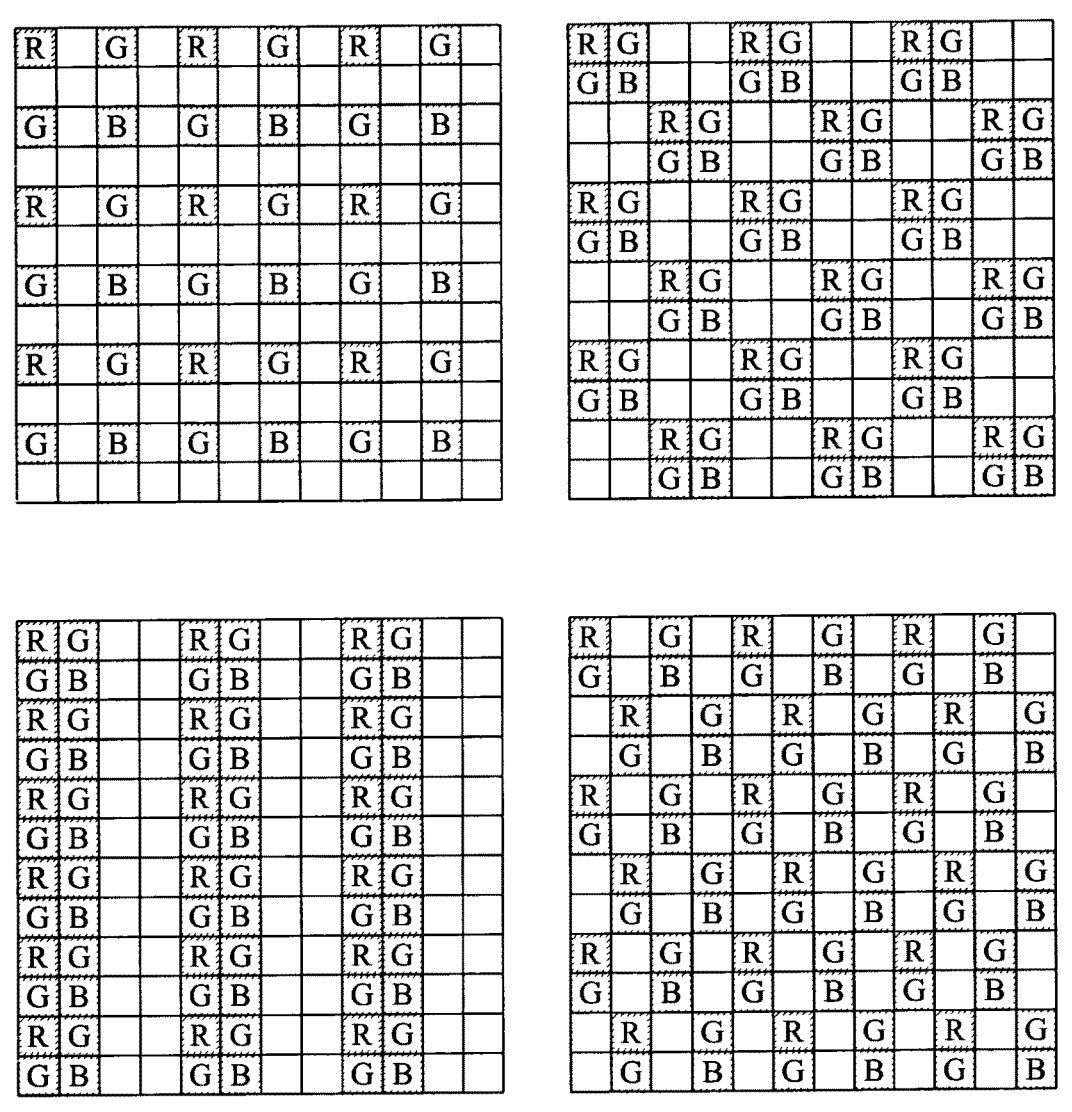

FIGS. 3A and 3B illustrate sensor panels 301 and 307, such as the sensor panel 107 of FIG. 1A, of a display apparatus, according to one or more embodiments.

Referring to FIG. 3A, the sensor panel 301 may be configured to include a sensor unit with a color filter to sense incident light that has passed through a pattern of a display panel, such as the pattern 105 of display panel 103 in FIG. 1, and to acquire respective image data corresponding to the color of the color filter. The sensor panel 301 may include a first sensor unit and a second sensor unit, for example. Each of the first sensor unit and the second sensor unit may also include respective differently colored unit color filters. Additionally, each of the first sensor unit and the second sensor unit may include a plurality of respective differently colored color filters. The first sensor units and the second sensor units may be organized according to any Bayer pattern, for example, and different first sensor units and second sensor units may be filter one or more different colors through different Bayer pattern.

As one example, as shown in the sensor panel 301 of FIG. 3A, the sensor panel 301 may be configured to have a first sensor unit 303 as red color unit color filter and to have a second sensor unit 305 as a blue color unit color filter. As another example, as shown in the sensor panel 307 of FIG. 3A, the sensor panel 307 may be configured to have each of the first sensor unit 309 and the second sensor unit 311 include a plurality of RGB color filters.

The configuration of the sensor panel is not limited to those shown in sensor panels 301 and 307 of FIG. 3A, and thus, the sensor panel may be configured to have various types of color filters as shown the different configurations shown in the upper left, upper right, lower left and lower right sensor panel illustrations in FIG. 3B.

Figure 4A:
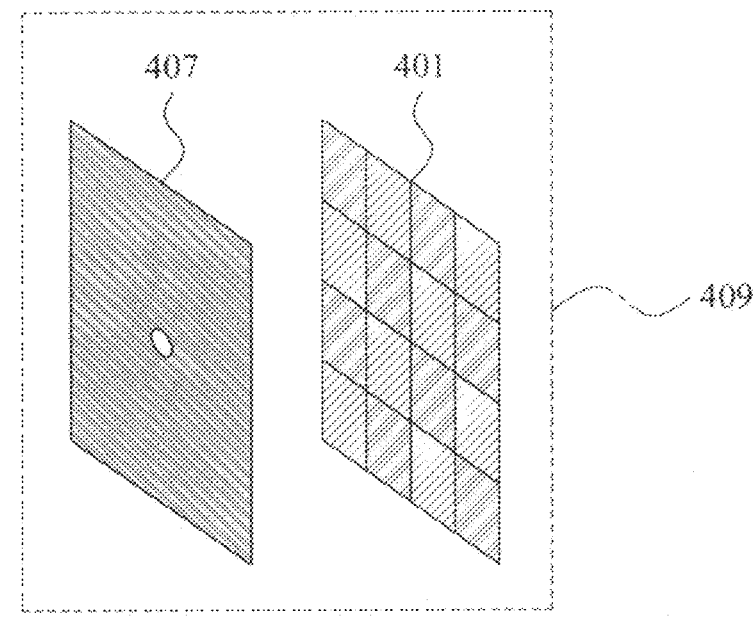
Figure 4A:
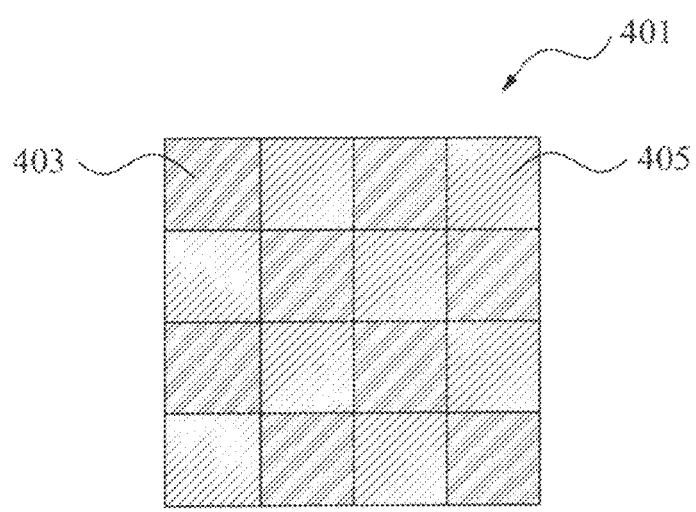
Figure 4B:
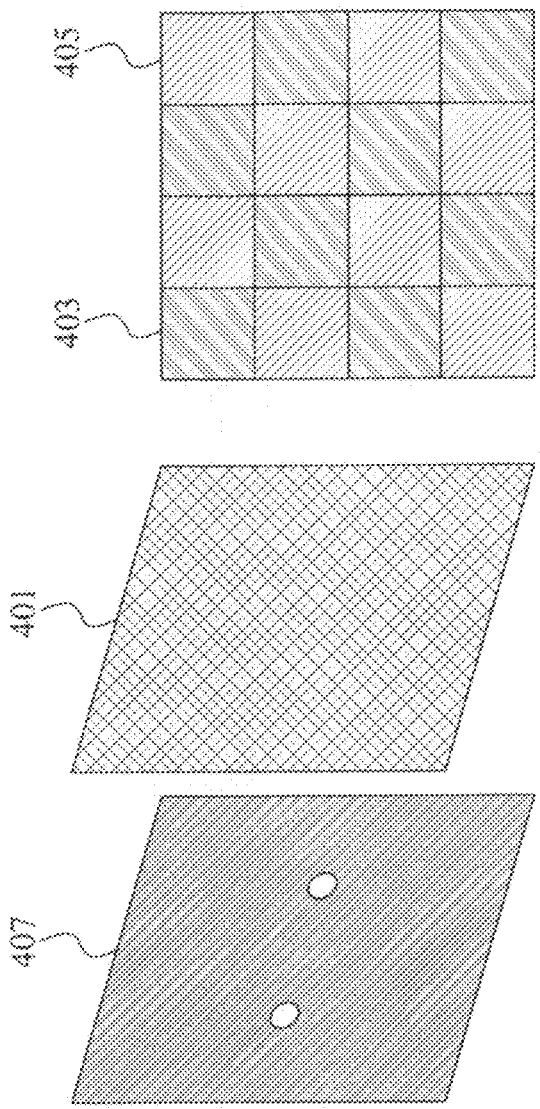

FIGS. 4A-4B illustrates a sensor panel 401, such as the sensor panel 107, of a display apparatus, according to one or more embodiments.

Referring to FIG. 4A, the sensor panel 401 may include a sensor unit 403 to sense incident light and a backlight unit 405 to radiate light towards a display panel 407. In one or more embodiments, the sensor panel 401 may be configured such that the sensor unit 403 and the backlight unit 405 are configured in a grid pattern, or the sensor unit 403 and the backlight unit 405 may be configured in a repeating pattern, and thus, in one or more embodiments, the sensor units 403 and the backlight units 405 may be uniformly distributed.

Accordingly, in such an embodiment, the sensor panel 401 may be configured to uniformly acquire incident first light, e.g., reflected from an object, and to uniformly radiate light. Here, the sensor units 403 and the backlight units 405 may be arranged so they are evenly distributed. Accordingly, the sensor panel 401 may uniformly acquire incident light from sensor units 403 and uniformly radiate light from the backlight units 405 to the display panel 407.

Since the sensor panel 401 includes the backlight unit 405, the light radiated from the backlight unit 405 to the display panel 407 may be directly emitted towards the display panel 407, instead of being emitted towards the display panel 407 through the sensor panel 401, e.g., as shown in FIGS. 2A and 2B. FIG. 4B also illustrates the sensor panel 401 and the display 407, but demonstrates where there are two pinholes or two patterns 105 in the display panel 407, which creates a captured stereo image by respective sensor units 403.

Accordingly, the sensor panel 401 and the backlight unit 405 may be integrally formed, and thus, it is possible to reduce the internal volume of the display apparatus, by removing the previously required backlight unit disposed below the sensor panel 401, thereby producing light with a slim display apparatus 409. Additionally, with this configuration there is an increase in efficiency of light emission over the arrangement of FIGS. 2A and 2B, for example, as light from a below backlight is not being limited to transmission through only the apertures 111.

Figure 5A:
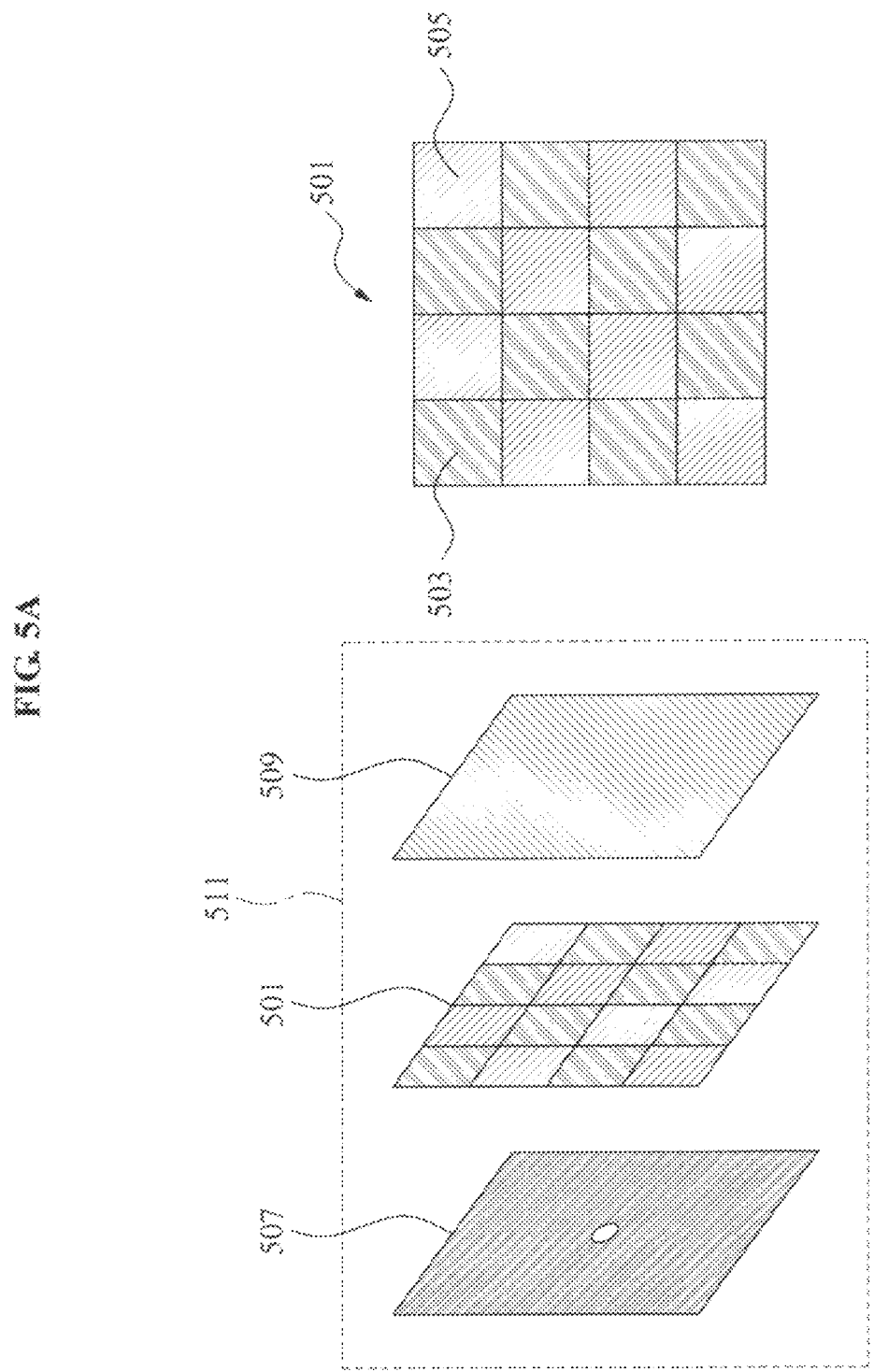

FIGS. 5A-5B illustrate a sensor panel 501, such as the sensor panel 107 of FIG. 1A, in a display apparatus, according to one or more embodiments.

Referring to FIG. 5A, the sensor panel 501 may include a sensor unit 503 to sense incident light and a diffuser 505 to diffuse light radiating from a backlight unit 509. The sensor panel 501 may be configured to have the sensor unit 503 and the diffuser 505 arranged in a grid pattern, or may be configure to have the sensor unit 503 and the diffuser 505 arranged in a repeating pattern, as only examples. Accordingly, in an embodiment, the sensor units 503 and the diffusers 505 may be uniformly distributed.

In such an embodiment, the sensor panel 501 may uniformly acquire incident first light, e.g., reflected from an object, by having the sensor units 503 and the diffusers 505 distributed evenly, and thus, may uniformly radiate a second light emitted from the backlight unit 509 to the display panel 507.

According to an embodiment, the display apparatus 511 using the sensor panel 501 including the diffuser 505 may directly sense incident light, passed through the display panel 507, using the sensor panel 501, and thereby acquire accurate image data with respect to an object, for example. FIG. 5B also illustrates the sensor panel 501 and the display 507, but demonstrates where there are two pinholes or two patterns 105 in the display panel 507, which creates a captured stereo image by respective sensor units 503.

FIGS. 6A through 6C, and FIG. 7 illustrate plural available patterns that may be formed in a display panel 601, such as the display panel 103 of FIG. 1A, in a display apparatus, according to one or more embodiments.

Figure 6A:
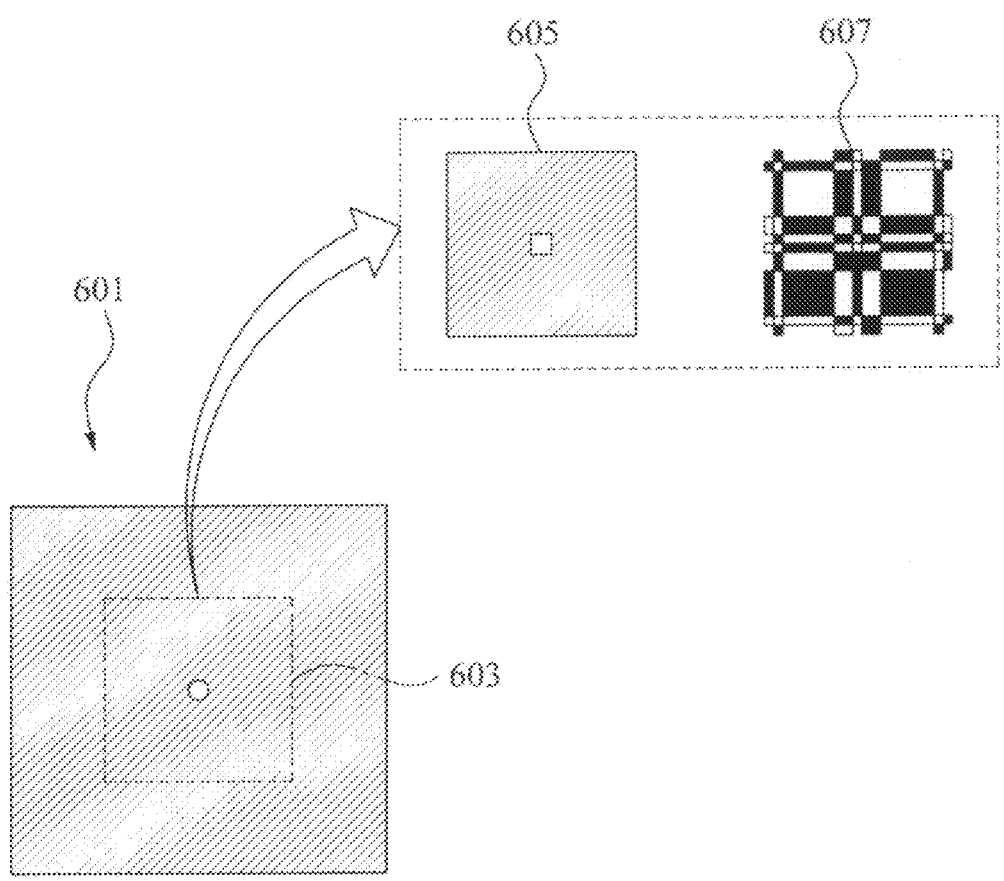
FIGS. 6A through 6C and FIG. 7 illustrate patterns formed by a display panel, such as the display panel 103 of FIG. 1A, in a display apparatus, according to one or more embodiments.

Referring to FIG. 6A, the display panel 601 may be controlled to form a pattern 603 by controlling a first pixel to be opaque and by controlling a second pixel, different from the first pixel, to be transparent, and may form a pattern to be included in the pattern 603 so that a light, e.g., reflected from an object, may pass through the pattern 603.

The display panel 601 may be controlled to form the pattern 603 to include a circular hole pattern. However, as this is only an example, the display panel 601 may be controlled to form a pattern 605, e.g., including a polygonal hole, and a pattern 607 including a MURA image.

Figure 6B:
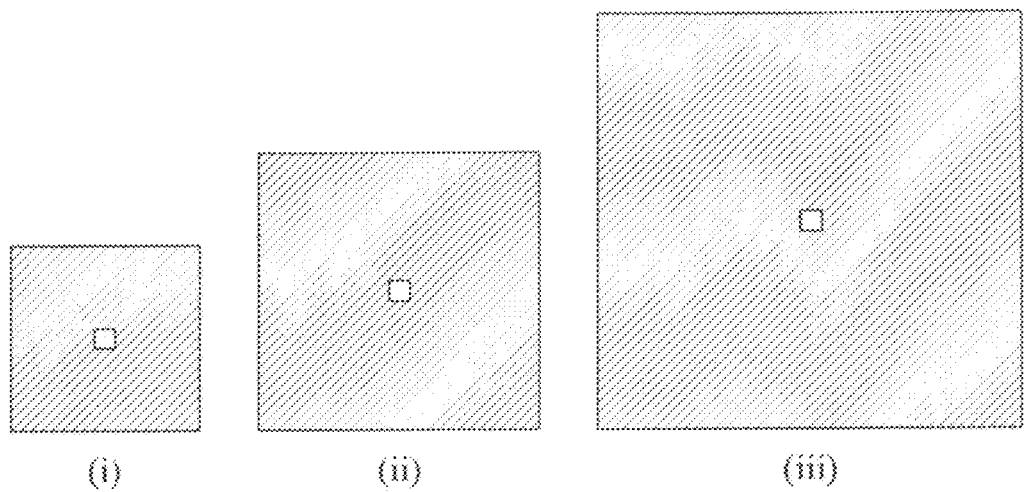
Figure 6C:
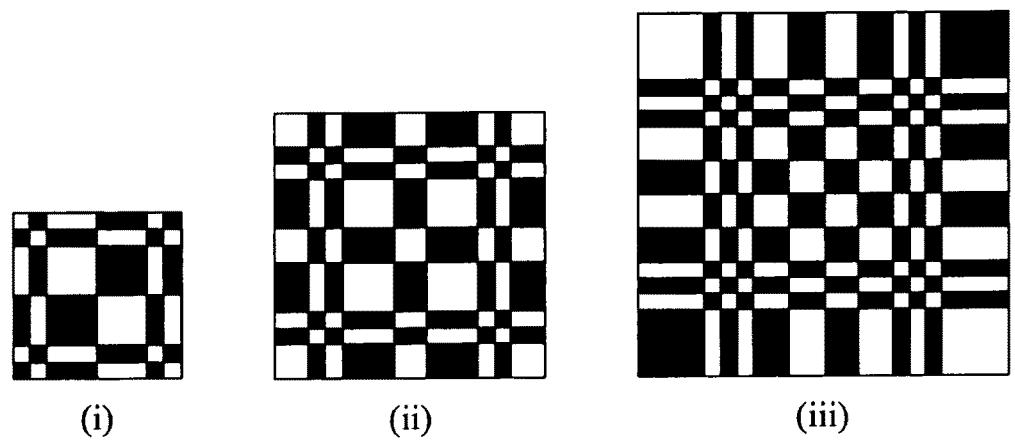

As shown in FIG. 6B, the display panel 601 may be controlled to form a pattern of 11×11 pixels (or sub-pixels), in illustration (i), a pattern of 17×17 pixels (or sub-pixels), in illustration (ii), and/or a pattern of 23×23 pixels (or sub-pixels), in illustration (iii). As shown in FIG. 6C, the display panel 601 may equally be controlled to form a MURA pattern of 11×11 pixels (or sub-pixels), in illustration (i), a MURA pattern of 17×17 pixels (or sub-pixels), in illustration (ii), and/or a MURA pattern of 23×23 pixels (or sub-pixels), in illustration (iii). The display panel 601 may be controlled to form both a pattern and a MURA pattern, with varying pixel or sub-pixel sizes. The illustration (i) of FIG. 6B may also represent a pattern using a single pixel or single sub-pixel.

Figure 7:
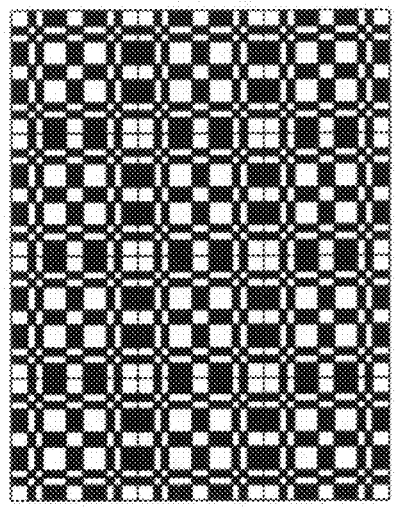
Figure 7:
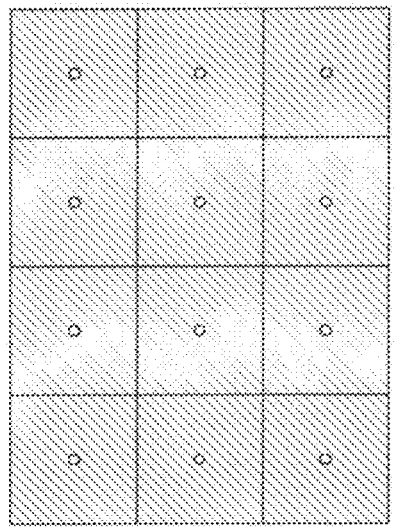
Figure 7:
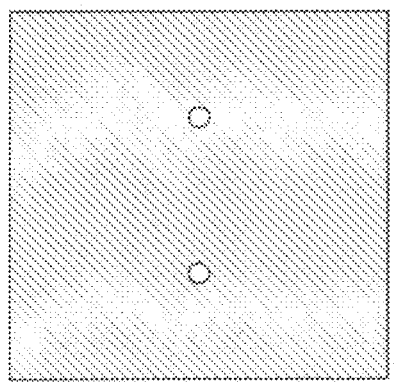

As shown in FIG. 7, the display panel 601 may form a plurality of patterns and may pass incident light, e.g., reflected from an object, using a plurality of patterns. The left illustration of FIG. 7 demonstrates the above-referenced stereo image, which may be useful for image capturing of a viewer, while the center and right illustrations of FIG. 7 demonstrate patterns that may be useful for gesture capturing or orthographic capturing of a view or object with greater three-dimensional data, for example. In one or more embodiments, even when plural patterns are used, the controller 115 of FIG. 1A, for example, may resolve the images both for depth and use some or all of the collected image information for generating a single image or one or more less images than patterns.

Figure 8:
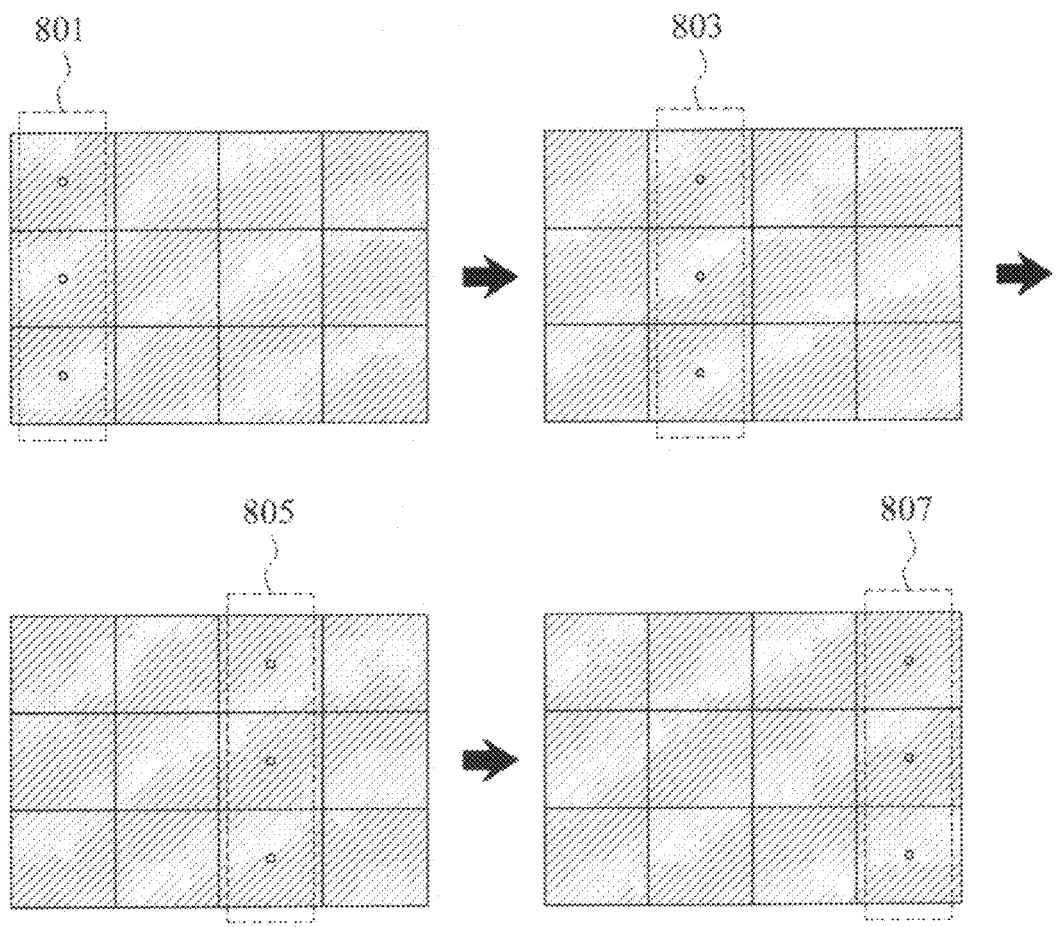
FIGS. 8 through 10 illustrate patterns formed by a display panel, such as the display panel 103 of FIG. 1A, in a display apparatus, according to one or more embodiments.
Figure 9:
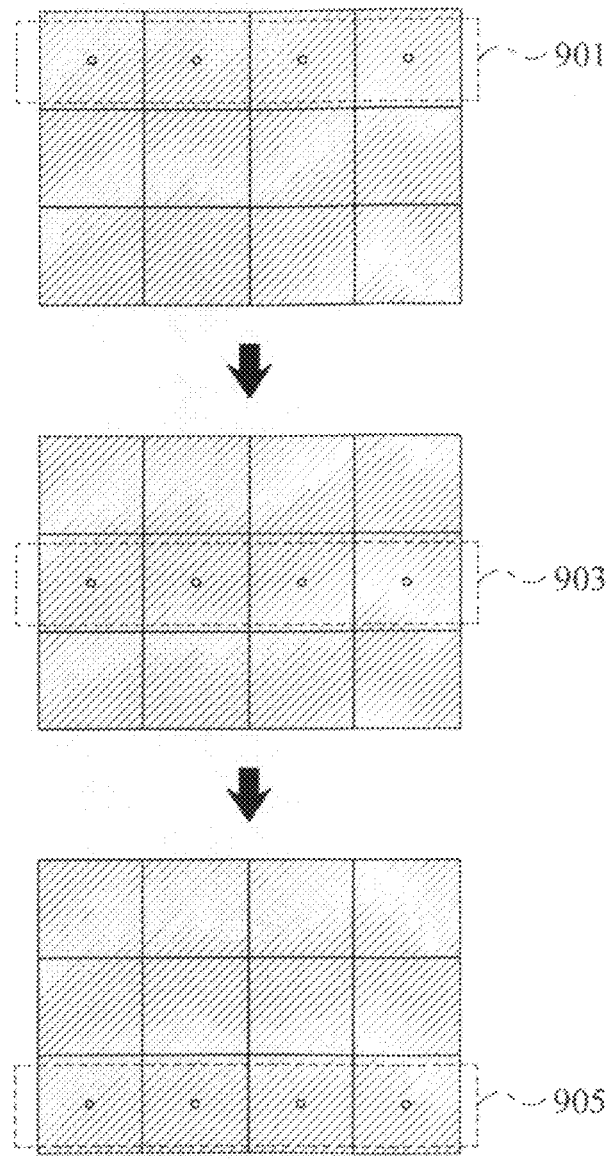
Figure 10:
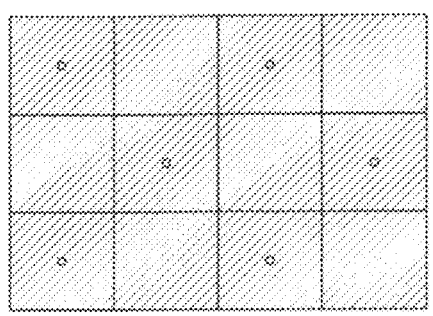
Figure 10:
Figure 10:
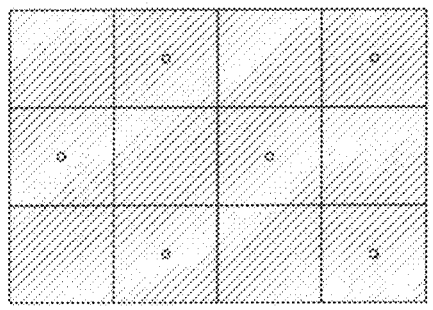

FIG. 8 through FIG. 10 illustrate patterns that may be formed by a display panel, such as by the display panel 103 of FIG. 1A, included in a display apparatus, according to one or more embodiments.

Here, the display panel may be controlled to form a plurality of patterns, and may adjust the number of patterns and/or the positions of each pattern by changing at least one of a number of opaque first pixels, a number of transparent second pixels, a position of each opaque first pixel, and a position of each transparent second pixel, for example.

Referring to FIG. 8, the display panel may horizontally sequence the plurality of patterns by sequentially forming the plurality of patterns in a first column 801, a second column 803, a third column 805, and a fourth column 807, at predetermined intervals, e.g., in different cycles of the available 120 cycles of an example 120 Hz refresh rate of an LCD screen.

Referring to FIG. 9, the display panel may be controlled to vertically sequence the plurality of patterns by sequentially forming the plurality of patterns in a first line 901, in a second line 903, and a third line 905, at predetermined intervals, e.g., in different cycles.

Referring to FIG. 10, the display panel may be controlled to alternately form the plurality of patterns, e.g., by sequentially changing pattern positions according to an interleaving scheme.

Figure 11B:
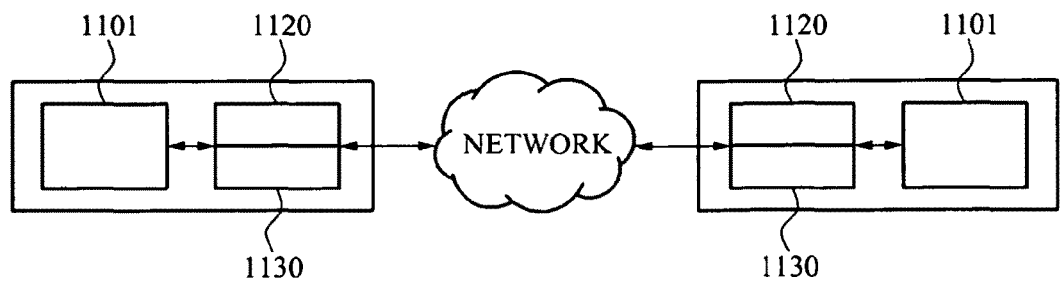
Figure 11C:
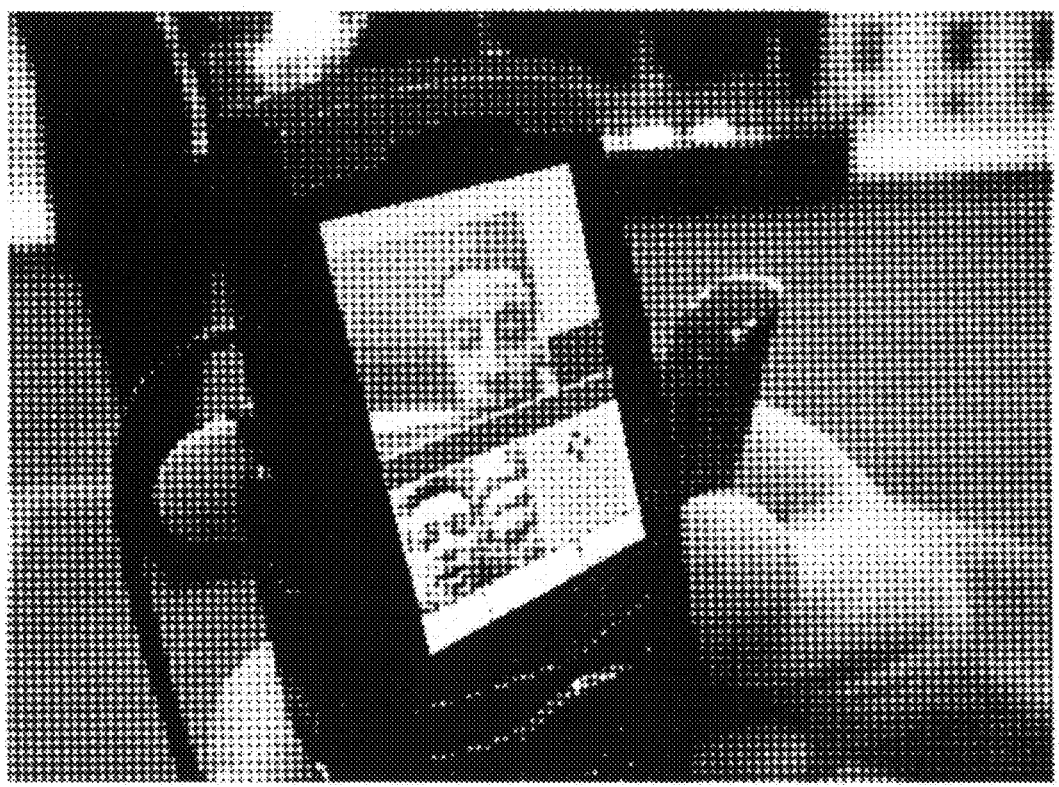

FIG. 11A through 11C illustrate a display device, system, and method, according to one or more embodiments.

Referring to FIG. 11A, the display device 1100 includes a display and user interface 1101, a controller 1115, a multimedia decoder 1120, a multimedia encoder 1130, a central processing unit (CPU), a memory 1150, transmitter/receiver 1160, speaker 1170, and microphone 1180, for example. The display and user interface 1101 may operate similarly to any of the above described display panels, sensor panels, sensor units, apertures, backlight units, and diffusing arrangements, with the controller 1115 operating as the controller 115 of FIG. 1A, for example. The captured image information may be analyzed by the controller 1115 or the necessary processing may be handed off to the CPU, such as where more extensive processing is required in gesture detection, facial detection, image resolution or convolution, and the like. The display and user interface 1101 may include user inputs through on/off-screen motion detection or gesture detection, as only example. The encoder 1130 may encode the captured image data, including performing any 3D graphics data encoding based upon the determined depth of one or more objects by the controller 1115, for example. The encoder may also encode captured audio data with the encoded image data, e.g., captured through the microphone 1180, according to any conventional video/audio encoding schemes, such as any MPEG standard, as only an example.

The encoder may also encode with or separately the encoded video and audio information and control information, e.g., the above discussed the environment or settings for the capturing and/or displaying modes and corresponding set configurations and arrangements, as only example, used in the image capturing which may be considered by a remote display device, such as in the system of FIG. 11B having first and second display devices 1100-1 and 1100-2.

The transmitter/receiver 1160 may then transmit the encoded data to the remote display device, such as the second display device 1000-2 of FIG. 11B. The transmitter/receiver 1160 may also receive similarly encoded information from the remote display device and forward the same to the decoder 1120, which decodes the video/audio data and any control data from the remote display device. The decoded video/audio information is then output through the display and any decoded control information is reviewed by the controller to determine whether to change the current image capturing settings of capturing mode of the display device 1100.

Referring to FIG. 11B, the system 1110 includes the display device 1100 and the remote display device of FIG. 11A, as the first display device 1100-1 and second display device 1100-2, in one or more embodiments, each being a display device corresponding to the display device 1100 of FIG. 11A, e.g., including a display and user interface 1101 and encoder and decoder elements 1125. The network 1190 may be any communication path available between the first display device 1000-1 and the second display device 1100-2, such as an Internet Protocol based network or wireless protocol, or a combination of the same. Both first and second display devices 1100-1 and 1100-2 do not need to be a display device corresponding to the display device 1100 of FIG. 11A, and accordingly, it may not be necessary to communicate between display devices how any transmitted image data was generated.

Referring to FIG. 11C, an alternative view of the display device 1100 of FIG. 11A is shown, with the viewer using a video call capability of the display device 1100. Though illustrated in FIG. 11C as a mobile phone or smart phone, the display devices 1100 of FIGS. 11A and 11B, as the first or second display devices 1101-1 and 1101-2 in the system 1110, may be any same or different type of display device in the system 1110, including televisions, a personal computer and display as a personal computer system, tablet computer devices, mobile phones, PDAs, teleconferencing devices, set-top boxes, etc. The system 1110 of FIG. 11B is intended to include any of these devices as either of the first or second display devices 1101-1 and 1101-2, without requiring the first or second display devices 1101-1 and 1101-2 to be the same type of display device.

In one or more embodiments, any apparatus, system, and unit descriptions herein include one or more hardware devices and/or hardware processing elements/devices, e.g., controllers incorporated into the displaying system or with hardware elements. For example, one or more embodiments include a controlling method and/or a controller device controlling the display panel to generate the pinhole apertures during the capturing mode and controlling the display panel to display an image during the displaying mode, distinctly from a controller that may control the sensor panel, or diffusing aspects. Each of these controllers may include such hardware processing elements. Additionally, one or more embodiments may include a configuration similar to that of FIG. 11A, including one or more processing elements in the controller, CPU, display, encoder, and/or decoder hardware portions of the mobile device. Accordingly, in one or more embodiments, any described apparatus, system, and unit may further include one or more desirable memories, and any desired hardware input/output transmission devices, as only examples. Further, the term apparatus should be considered synonymous with elements of a physical system, not limited to a device, i.e., a single device at a single location, or enclosure, or limited to all described elements being embodied in single respective element/device or enclosures in all embodiments, but rather, depending on embodiment, is open to being embodied together or separately in differing devices or enclosures and/or differing locations through differing hardware elements.

In addition to the above described embodiments, embodiments can also be implemented through computer readable code/instructions in/on a non-transitory medium, e.g., a computer readable medium, to control at least one processing element/device, such as a processor, computing device, computer, or computer system with peripherals, to implement any above described embodiment or aspect of any embodiment. The medium can correspond to any defined, measurable, and tangible structure permitting the storing and/or transmission of the computer readable code. Additionally, one or more embodiments include the at least one processing element or device.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and/or perform program instructions, such as read-only memory (ROM), random access memory (RAM), flash memory, and the at least one processing device, respectively. Computer readable code may include both machine code, such as produced by a compiler, and files containing higher level code that may be executed by the computer using an interpreter, for example. The media may also be any defined, measurable, and tangible elements of one or more distributed networks, so that the computer readable code is stored and/or executed in a distributed fashion. In one or more embodiments, such distributed networks do not require the computer readable code to be stored at a same location, e.g., the computer readable code or portions of the same may be stored remotely, either stored remotely at a single location, potentially on a single medium, or stored in a distributed manner, such as in a cloud based manner. Still further, as noted and only as an example, the processing element could include a processor or a computer processor, and processing elements may be distributed and/or included in a single device. There may be more than one processing element and/or processing elements with plural distinct processing elements, e.g., a processor with plural cores, in which case one or more embodiments would include hardware and/or coding to enable single or plural core synchronous or asynchronous operation.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A display apparatus, comprising:
a sensor panel configured to sense a first incident light, incident to the sensor panel subsequent to passing through a display, and configured to at least partially block transmission of light through the sensor panel; and
a controller configured to selectively control the display to pass the first incident light toward the sensor panel, to control the display to pass light out of the display to display an image, to determine a depth of an object represented in the first incident light based upon at least one detected size of a blur of at least one pattern detected by the sensor panel, and to restore a captured image by calculating a distance-based impulse response based on the determined depth by performing devolution of the captured image using the distance-based impulse response to compensate for refraction or geometric effects caused by the at least one pattern of the display,
wherein the sensor panel comprises first plural distinct portions configured to each forward light from the sensor panel towards the display and second plural distinct portions configured to each sense incident light intensity, wherein the second plural distinct portions are distinct from the first plural distinct portions and block transmission of light through the sensor panel toward the display.

2. The display apparatus of claim 1, wherein the controller selectively controls the display to only pass the first incident light toward the sensor panel in a first cycle, of plural fixed time length cycles, and controls the display to only pass the light out of the display to display the image in a second cycle, of the plural fixed time length cycles.

3. The display apparatus of claim 2, wherein the fixed time is a time it takes for the display to perform one refresh.

4. The display apparatus of claim 1, wherein, in response to the controller selectively controlling plural images to be captured from plural sensings of respective first incident lights, representing a capture rate, from a pattern of the display controlled by the controller to not change upon the controller controlling the display to display the image, the controller controls the capture rate plus a display rate, for displaying plural images, to be greater than a maximum refresh rate of the display.

5. The display apparatus of claim 1, wherein the controller selectively controls opacities of pixels and/or sub-pixels of the display to produce patterns on the display for displaying the image on the display, in a second mode, and to form at least one pattern on the display controlled to be transparent and an area of the display surrounding the at least one pattern controlled to be opaque, to capture an image by at least one sensor unit, of the second plural distinct portions, in a first mode, wherein the display is controlled by the controller differently in the first mode and the second mode.

6. The display apparatus of claim 1, wherein the controller determines plural depth measurements of the object represented in plural first incident lights each sensed by the sensor panel based respectively upon at least one detected size of a blur pattern for each sensed incident light, and generates 3D information of the object.

7. The display apparatus of claim 6, wherein the controller controls a monitoring of movement by the object over plural captured images and respectively generated plural 3D information and determines whether the monitored movement and generated plural 3D information indicates that a gesture, of plural defined gestures, is being made by the movement of the object.

8. The display apparatus of claim 1, further comprising:
a display panel, as the display; and
a backlight unit configured to emit a second light towards the sensor panel,
wherein the controller selectively controls the display panel for passing the first incident light toward the sensor panel, in a first mode, and controls the display panel for passing the second light through the display panel to display the image, in a second mode.

9. The display apparatus of claim 8, wherein the first plural distinct portions are each configured to always forward the second light from the backlight unit towards the display unit.

10. The display apparatus of claim 8, wherein the controller controls the backlight unit to emit light in the second mode and to not emit light during the first mode.

11. The display apparatus of claim 8, wherein the display device is one of a television, a personal computer system, a tablet computer device, a mobile phone, a PDA, teleconferencing devices or system, or set-top box, with each comprising at least one processor and memory, an encoder to encode an image captured by the sensing by the sensor panel in the first mode, a decoder to at least decode image data received from an external source, and with the controller forwarding decoded image data from the decoder to the display panel and controlling the display panel to display the decoded image data in the second mode.

12. The display apparatus of claim 11, wherein the controller selectively controls opacities of pixels and/or sub-pixels of the display panel to produce patterns on the display panel for displaying the image on the display panel, in a second mode, and to form at least one pattern on the display panel controlled to comprise at least one transparent pixel or sub-pixel and an area of the display panel surrounding the at least one pattern controlled to be opaque, to capture an image by at least one sensor unit of the sensor panel, in a first mode, wherein the display panel is controlled by the controller differently in the first mode and the second mode.

13. The display apparatus of claim 11, wherein the controller controls a monitoring of movement of an object, represented in the first incident light, over plural captured images and respectively generated plural 3D information for the object and determines whether the monitored movement and generated plural 3D information indicates that a gesture, of plural defined gestures, is being made by the movement of the object.

14. The display apparatus of claim 1, wherein, in response to the controller selectively controlling plural images to be captured from plural sensings of respective first incident lights, representing a capture rate, from a pattern of the display controlled by the controller to not change upon the controller controlling the display to display the image, the controller controls the capture rate plus a display rate, for displaying plural images, to be greater than a maximum refresh rate of the display.

15. The display apparatus of claim 1, further comprising:
a display panel, as the display; and
plural backlight units respectively being the first plural distinct portions of the sensor panel, each configured to respectively emit a second light towards the display panel,
wherein the controller selectively controls the display panel to pass the first incident light toward the sensor panel in a first mode and controls the display panel to pass each of the second lights through the display panel in a second mode.

16. The display apparatus of claim 15, wherein the controller controls each of the plural backlight units to emit light in the second mode and to not emit light during the first mode.

17. The display apparatus of claim 15, wherein the display device is one of a television, a personal computer system, a tablet computer device, a mobile phone, a PDA, teleconferencing devices or system, or set-top box, with each comprising at least one processor and memory, an encoder to encode an image captured by the sensing by the sensor panel in the first mode, a decoder to at least decode image data received from an external source, and with the controller forwarding decoded image data from the decoder to the display panel and controlling the display panel to display the decoded image data in the second mode.

18. The display apparatus of claim 17, wherein the controller selectively controls opacities of pixels and/or sub-pixels of the display panel to produce patterns on the display panel for displaying the image on the display panel, in a second mode, and to form at least one pattern on the display panel controlled to comprise at least one transparent pixel or sub-pixel and an area of the display panel surrounding the at least one pattern controlled to be opaque, to capture an image by at least one sensor unit of the sensor panel, in a first mode, wherein the display panel is controlled by the controller differently in the first mode and the second mode.

19. The display apparatus of claim 17, wherein the controller controls a monitoring of movement of an object, represented in the first incident light, over plural captured images and respectively generated plural 3D information for the object and determines whether the monitored movement and generated plural 3D information indicates that a gesture, of plural defined gestures, is being made by the movement of the object.

20. The display apparatus of claim 1, wherein:
the sensor panel comprises a first sensor unit and a second sensor unit to sense the incident first light, and
each of the first sensor unit and the second sensor unit comprise a unit color filter having a different color filter.

21. The display apparatus of claim 20, wherein plural sensor units of the sensor panel are collectively organized in different Bayer patterns.

22. The display apparatus of claim 1, wherein the sensor panel comprises a first sensor unit and a second sensor unit to sense the incident first light, and each of the first sensor unit and the second sensor unit comprise a plurality of color filters respectively filtering different colors.

23. The display apparatus of claim 1, further comprising a display panel, as the display, wherein, in a first mode, the controller controls the display panel to selectively form at least one pattern to pass the first incident light through the display panel to the sensor panel by selectively controlling respective opacities of pixels or sub-pixels of the display panel to be different, controlled differently than when the controller controls the display panel to display the image, in a second mode.

24. The display apparatus of claim 23, wherein the controller controls, at a current time in the first mode, the display panel to have at least one pattern different than a pattern formed at a previous time when the display apparatus was in the first mode, by changing at least one of a number of first pixels of the display panel that are selectively controlled to be opaque during the first mode, a number of second pixels of the display panel that are selectively controlled to be transparent during the first mode, positions of one or more pixels of the display panel that are controlled to be opaque during the first mode, and positions of one or more pixels of the display panel that are controlled to be transparent pixels during the first mode, than in the previous time.

25. The display apparatus of claim 23, wherein the controller selectively controls the display panel to form, as the at least one pattern, at least one of a circular pattern, a polygonal pattern, and a modified uniformly redundant array (MURA) by controlling plural first pixels or plural first sub-pixels to be opaque and plural second pixels or plural second sub-pixels to be transparent within a predetermined area of the display panel.

26. The display apparatus of claim 25, wherein the predetermined area is one of 11×11 pixels, 11×11 sub-pixels, 17×17 pixels, 17×17 sub-pixels, 23×23 pixels, and 23×23 sub-pixels.

27. The display apparatus of claim 1, wherein the sensor panel is constructed of a substrate material that does not transmit light.

28. The display apparatus of claim 1, wherein the first plural distinct portions and the second plural distinct portions are arranged in a grid pattern across the sensor panel.

29. The display apparatus of claim 1, wherein the controller is further configured to encode the first incident light in a 3D graphics data format based on the determined depth.

30. The display apparatus of claim 1, wherein the controller is further configured to restore an image of a view based on the determined depth and the first incident light.

31. A display apparatus, comprising:
a sensor panel configured to sense a first incident light, incident to the sensor panel subsequent to passing through a display, and configured to at least partially block transmission of light through the sensor panel; and
a controller configured to selectively control the display to pass the first incident light toward the sensor panel, to control the display to pass light out of the display to display an image, and to determine a depth of an object represented in the first incident light based upon at least one detected size of a blur of at least one pattern detected by the sensor panel,
wherein the sensor panel comprises first plural distinct portions configured to each forward light from the sensor panel towards the display and second plural distinct portions configured to each sense incident light intensity, wherein the second plural distinct portions are distinct from the first plural distinct portions and block transmission of light through the sensor panel toward the display, and
wherein the controller restores the captured image by calculating a distance-based impulse response based on the determined depth and by performing devolution of the captured image using the distance-based impulse response to compensate for refraction or geometric effects caused by the at least one pattern of the display, wherein the devolution is performed according to:

$I(x,y)=I'(x,y)*H^{-1}(x,y),$ wherein $I(x, y)$ represents the restored image, $I'(x, y)$ represents the captured image with blurred image data, and $H^{-1}(x, y)$ represents the distance-based impulse response.

32. A display apparatus, comprising:
a sensor panel configured to sense a first incident light, incident to the sensor panel subsequent to passing through a display, and configured to at least partially block transmission of light through the sensor panel; and
a controller configured to selectively control the display to pass the first incident light toward the sensor panel, to control the display to pass light out of the display to display an image, and to determine a depth of an object represented in the first incident light based upon at least one detected size of a blur of at least one pattern detected by the sensor panel,
wherein the sensor panel comprises first plural distinct portions configured to each forward light from the sensor panel towards the display and second plural distinct portions configured to each sense incident light intensity, wherein the second plural distinct portions are distinct from the first plural distinct portions and block transmission of light through the sensor panel toward the display, and
wherein the controller restores the captured image by calculating a distance-based impulse response based on a determined depth of an object, represented in the first incident light, and by performing devolution of a captured image using the distance-based impulse response to compensate for refraction aid/or geometric effects caused by a pattern of the display panel from where the first incident light passed through the display panel,
wherein the determined depth of the object is calculated by the controller based upon at least one detected size of a blur of the first incident light, as incident on the sensor panel, wherein the devolution is performed according to:

$I(x,y)=I'(x,y)*H^{-1}(x,y),$ wherein $I(x, y)$ represents the restored image, $I'(x, y)$ represents the captured image with blurred image data comprising the blur of the first incident light, and $H^{-1}(x, y)$ represents the distance-based impulse response.

33. A display apparatus, comprising:
a sensor panel configured to sense a first incident light, incident to the sensor panel subsequent to passing through a display, and configured to at least partially block transmission of light through the sensor panel, wherein the sensor panel comprises plural distinct portions configured to each forward light from the sensor panel towards the display;
a controller configured to selectively control the display to pass the first incident light toward the sensor panel, to control the display to pass light out of the display to display an image, to determine a depth of an object represented in the first incident light based upon at least one detected size of a blur of at least one pattern detected by the sensor panel, and to restore a captured image by calculating a distance-based impulse response based on the determined depth by performing devolution of the captured image using the distance-based impulse response to compensate for refraction or geometric effects caused by the at least one pattern of the display; and
a backlight unit configured to generate the light to be forwarded by the plural distinct portions of the sensor panel, wherein the sensor panel comprises
plural sensor units configured to sense the first incident light, in a first mode, and
plural apertures, respectively as the plural distinct portions, configured to pass the second light emitted from the backlight unit towards the display in first and second modes, with the controller controlling the display to display an image in the second mode,
wherein the plural sensor units and plural apertures are arranged in a grid pattern across the sensor panel.

34. The display apparatus of claim 33, wherein the apertures respectively comprise a diffuser to diffuse the second light.

35. A display apparatus, comprising:
a sensor panel configured to sense a first incident light, incident to the sensor panel subsequent to passing through a display, and configured to at least partially block transmission of light through the sensor panel; and
a controller configured to selectively control the display to pass the first incident light toward the sensor panel, to control the display to pass light out of the display to display an image, to determine a depth of an object represented in the first incident light based upon at least one detected size of a blur of at least one pattern detected by the sensor panel, and to restore a captured image by calculating a distance-based impulse response based on the determined depth and by performing devolution of the captured image using the distance-based impulse response to compensate for refraction or geometric effects caused by the at least one pattern of the display, wherein the sensor panel comprises plural distinct portions configured to each forward light from the sensor panel towards the display, and wherein the controller further comprises a sensor image restoring unit to interpolate image data acquired by the sensing of the first incident light and to restore image data for light incident on non-sensing portions of the sensor panel that is not captured by any sensing of the sensor panel at the plural distinct portions of the sensor panel.

36. A display apparatus, comprising:
a display panel;
a sensor panel comprising plural sensor units configured to sense incident light from the display panel and plural distinct portions configured to each forward light from the sensor panel towards the display panel, the plural sensor units being distinct from the plural distinct portions; and
a controller to selectively control opacities of pixels and/or sub-pixels of the display panel to produce patterns on the display panel for displaying an image on the display panel, in a second mode, to form at least one pattern on the display panel controlled to be transparent and an area of the display panel surrounding the at least one pattern controlled to be opaque, to capture an image by the at least one sensor unit, in a first mode, to determine a depth of an object represented in the first incident light based upon at least one detected size of a blur of the at least one pattern detected by the sensor panel, and to restore a captured image by calculating a distance-based impulse response based on the determined depth by performing devolution of the captured image using the distance-based impulse response to compensate for refraction or geometric effects caused by the at least one pattern of the display
wherein the plural distinct portions are respectively plural apertures or plural backlight units, with one or more of the plural apertures comprising a diffuser element, and with each of the plural backlight units respectively generating and directing light toward the display panel.

37. The display apparatus of claim 36, wherein the plural sensor units and plural distinct portions are arranged in a grid pattern across the sensor panel.

38. A display method, comprising:
selectively configuring a display to form a pattern with at least one transparent pixel or sub-pixel to pass a first incident light through the display and toward a sensor panel, behind the display, and to form an opaque area that at least surrounds the pattern, when a current mode is a first mode, and configuring the display to pass light from a backlight, behind the display, through the display, when the current mode is a second mode;
sensing the first incident light, having passed through the display, upon incidence to the sensor panel that at least partially blocks transmission of light, in a first mode;
displaying an image on the display by passing light in a direction from the sensor layer through the display;
repeatedly controlling the current mode to only one of the first mode and the second mode, comprising at least a changing of the current mode plural times;
selectively controlling a combination of a capture rate, for capturing images from the sensor panel, and a display rate, for displaying plural images, to be greater than a maximum refresh rate of the display;
determining a depth of an object represented in the first incident light based upon at least one detected size of a blur of at least one pattern detected by the sensor panel;
restoring a captured image by calculating a distance-based impulse response based on the determined depth; and
performing devolution of the captured image using the distance-based impulse response to compensate for refraction and/or geometric effects caused by the at least one pattern of the display.

39. The method of claim 38, further comprising controlling, at a current time in the first mode, the display to have at least one pattern different than a pattern formed at a previous time when the current mode was the first mode, by changing at least one of a number of first pixels of the display that are selectively controlled to be opaque during the first mode, a number of second pixels of the display that are selectively controlled to be transparent during the first mode, positions of one or more pixels of the display that are controlled to be opaque during the first mode, and positions of one or more pixels of the display that are controlled to be transparent pixels during the first mode, than in the previous time.

40. The method of claim 38, further comprising controlling, at a current time in the first mode, the display to have at least one pattern different than a pattern formed at a previous time when the current mode was the first mode, by changing at least one of a number of first sub-pixels of the display that are selectively controlled to be opaque during the first mode, a number of second sub-pixels of the display that are selectively controlled to be transparent during the first mode, positions of one or more sub-pixels of the display that are controlled to be opaque during the first mode, and positions of one or more sub-pixels of the display that are controlled to be transparent pixels during the first mode, than in the previous time.

41. The method of claim 38, further comprising selectively controlling the display to only pass the first incident light toward the sensor panel in a first cycle, of plural fixed time length cycles, and controlling the display to only pass the light out of the display to display the image in a second cycle, of the plural fixed time length cycles,
wherein the fixed time is a time it takes for the display to perform one refresh.

42. The method of claim 38, further comprising selectively controlling opacities of pixels and/or sub-pixels of the display to produce patterns on the display for displaying the image on the display, in a second mode, and to form at least one pattern on the display controlled to be transparent and an area of the display surrounding the at least one pattern controlled to be opaque, to capture an image by at least one sensor unit of the sensor, in a first mode, wherein the display is controlled differently in the first mode and the second mode.

43. The method of claim 38, wherein the determining further comprises determining plural depth measurements of the object represented in plural first incident lights each sensed by the sensor panel based respectively upon at least one detected size of a blur pattern for each sensed incident light, and generating 3D information of the object.

44. The method of claim 43, further comprising monitoring a movement by the object over plural captured images and respectively generated plural 3D information and determining whether the monitored movement and generated plural 3D information indicates that a gesture, of plural defined gestures, is being made by the movement of the object, and controlling an operation of a device based on the determined gesture.

45. A display method, comprising:
selectively configuring a display to form a pattern with at least one transparent pixel or sub-pixel to pass a first incident light through the display and toward a sensor panel, behind the display, and to form an opaque area that at least surrounds the pattern, when a current mode is a first mode, and configuring the display to pass light from a backlight, behind the display, through the display, when the current mode is a second mode,
sensing the first incident light, having passed through the display, upon incidence to the sensor panel that at least partially blocks transmission of light, in a first mode;
displaying an image on the display by passing light in a direction from the sensor layer through the display,
repeatedly controlling the current mode to only one of the first mode and the second mode, comprising at least a changing of the current mode plural times;
selectively controlling a combination of a capture rate, for capturing images from the sensor panel, and a display rate, for displaying plural images, to be greater than a maximum refresh rate of the display;
determining a depth of an object represented in the first incident light based upon at least one detected size of a blur of at least one pattern detected by the sensor panel;
restoring a captured image by calculating a distance-based impulse response based on the determined depth;
performing devolution of the captured image using the distance-based impulse response to compensate for refraction or geometric effects caused by the at least one pattern of the display; and
encoding the restored captured image,
wherein the devolution is performed according to:

$$I(x,y)=I'(x,y)*H^{-1}(x,y),$$

wherein I(x, y) represents the restored image, I'(x, y) represents the captured image with blurred image data, and $H^{-1}(x, y)$ represents the distance-based impulse response.

46. A display method, comprising:
selectively configuring a display to form a pattern with at least one transparent pixel or sub-pixel to pass a first incident light through the display and toward a sensor panel, behind the display, and to form an opaque area that at least surrounds the pattern, when a current mode is a first mode, and configuring the display to pass light from plural backlights of the sensor panel through the display, when the current mode is a second mode;
sensing the first incident light, having passed through the display, upon incidence to the sensor panel that blocks transmission of light, in a first mode;
displaying an image on the display by passing respectively generated light from each backlight from the sensor layer through the display;
repeatedly controlling the current mode to be one of the first mode and the second mode, comprising at least a changing of the current mode plural times;
selectively controlling a combination of a capture rate, for capturing images from the sensor panel, and a display rate, for displaying plural images, to be greater than a maximum refresh rate of the display;
determining a depth of an object represented in the first incident light based upon at least one detected size of a blur of the at least one pattern detected by the sensor panel;
restoring a captured image by calculating a distance-based impulse response based on the determined depth; and
performing devolution of the captured image using the distance-based impulse response to compensate for refraction and/or geometric effects caused by the at least one pattern of the display.

47. A display apparatus, comprising:
a sensor panel configured to sense a first incident light, incident to the sensor panel subsequent to passing through a display, and configured to at least partially block transmission of light through the sensor panel; and
a controller configured to selectively control the display to pass the first incident light toward the sensor panel, to control the display to pass light out of the display to display an image, and to determine a depth of an object represented in the first incident light based upon at least one detected size of a blur of at least one pattern detected by the sensor panel,
wherein the sensor panel comprises first plural distinct portions configured to each forward light from the sensor panel towards the display and second plural distinct portions configured to each sense incident light intensity, wherein the second plural distinct portions are distinct from the first plural distinct portions and block transmission of light through the sensor panel toward the display, and
wherein the controller uses respective captured image data of an object from two or more second plural distinct portions to perform a devolution of a captured image of the object made up of the respective captured data, using a distance-based impulse response to compensate for refraction or geometric effects caused by at least one pattern of the display, to restore the captured image of the object, wherein the devolution is performed according to:

$$I(x,y)=I'(x,y)*H^{-1}(x,y),$$

wherein I(x, y) represents the restored image, I'(x, y) represents the captured image with blurred image data, and $H^{-1}(x, y)$ represents the distance-based impulse response.

48. The display apparatus of claim 47, wherein the controller determines plural depth measurements of the object represented in plural first incident lights each sensed by the two or more of the second plural distinct portions based respectively upon at least one detected size of a blur pattern for each sensed incident light, and wherein the distance-based impulse response is based upon the determined plural depth measurements.

49. The display apparatus of claim 47, wherein the controller further comprises a sensor image restoring unit to interpolate image data acquired by the sensing of the first incident light and to restore image data that is not captured by any sensing of the sensor panel at the plural distinct portions of the sensor panel, in the restoration of the captured image of the object.

* * * * *